United States Patent
Albani et al.

(10) Patent No.: US 11,192,986 B2
(45) Date of Patent: Dec. 7, 2021

(54) BINDER SYSTEM

(71) Applicant: Owens Corning Intellectual Capital, LLC, Toledo, OH (US)

(72) Inventors: Bryan Alan Albani, Columbus, OH (US); Jesus M. Hernandez-Torres, Pataskala, OH (US); Jose Mendez-Andino, Columbus, OH (US); Scott William Schweiger, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 238 days.

(21) Appl. No.: 15/614,797

(22) Filed: Jun. 6, 2017

(65) Prior Publication Data

US 2017/0349718 A1    Dec. 7, 2017

Related U.S. Application Data

(60) Provisional application No. 62/345,885, filed on Jun. 6, 2016.

(51) Int. Cl.
*C08J 5/04* (2006.01)
*C08K 3/30* (2006.01)
(Continued)

(52) U.S. Cl.
CPC .............. *C08J 5/043* (2013.01); *C03C 13/00* (2013.01); *C08K 3/28* (2013.01); *C08K 3/30* (2013.01);
(Continued)

(58) Field of Classification Search
CPC ......... C08J 5/043; C08J 2329/04; C08K 3/28; C08K 3/30; C08K 2003/285;
(Continued)

(56) References Cited

U.S. PATENT DOCUMENTS 2,931,749 A    4/1960 Kine et al.
3,444,037 A    5/1969 Armour
(Continued)

FOREIGN PATENT DOCUMENTS

EP    0990728    4/2000
EP    2990494 A1    3/2016
(Continued)

OTHER PUBLICATIONS

International Search Report and Written Opinion from PCT/US2017/036060 dated Jun. 6, 2017.
(Continued)

*Primary Examiner* — Jeremy R Pierce
(74) *Attorney, Agent, or Firm* — Calfee, Halter & Griswold LLP

(57) ABSTRACT

An environmentally friendly, aqueous binder composition that includes a metal salt and a polyol is provided. The metal salt may be a water soluble salt, including salts of boron, aluminum, gallium, indium, tin, zirconium, thallium, lead, and bismuth. The polyol may include water miscible or water soluble polymeric alcohols including polyvinyl alcohol. The binder composition may be used in the formation of insulation materials and non-woven mats, among other products.

11 Claims, 30 Drawing Sheets

(51) Int. Cl.
*C08K 3/28* (2006.01)
*D04H 3/12* (2006.01)
*D04H 3/004* (2012.01)
*C03C 13/00* (2006.01)
*D04H 1/587* (2012.01)
*D04H 1/4218* (2012.01)

(52) U.S. Cl.
CPC .......... *D04H 1/4218* (2013.01); *D04H 1/587* (2013.01); *D04H 3/004* (2013.01); *D04H 3/12* (2013.01); *C08J 2329/04* (2013.01); *C08K 2003/285* (2013.01); *C08K 2003/3081* (2013.01)

(58) Field of Classification Search
CPC .......... C08K 2003/3081; C03C 13/00; D04H 3/004; D04H 3/12
See application file for complete search history.

(56) References Cited

U.S. PATENT DOCUMENTS

| | | | |
|---|---|---|---|
| 3,644,251 A | 2/1972 | Wilhelmi | |
| 3,759,736 A * | 9/1973 | Jenny | C08L 29/04 442/130 |
| 3,808,165 A | 4/1974 | Duchane | |
| 3,912,581 A | 10/1975 | Fink et al. | |
| 4,235,764 A * | 11/1980 | Dereser | C03C 25/26 428/392 |
| 4,260,597 A | 4/1981 | Porteous | |
| 4,339,566 A | 7/1982 | Rosenkranz et al. | |
| 4,459,379 A | 7/1984 | Schwarz | |
| 4,483,976 A | 11/1984 | Yamamoto et al. | |
| 4,659,771 A | 4/1987 | Craig | |
| 4,847,143 A | 7/1989 | Watanabe et al. | |
| 4,966,939 A | 10/1990 | Craig | |
| 4,997,877 A | 3/1991 | Craig | |
| 5,196,470 A | 3/1993 | Anderson et al. | |
| 5,244,695 A | 9/1993 | Davidowich et al. | |
| 5,539,077 A * | 7/1996 | Floyd | C08G 12/00 528/245 |
| 5,661,213 A | 8/1997 | Arkens et al. | |
| 5,763,524 A | 6/1998 | Arkens et al. | |
| 6,136,916 A | 10/2000 | Arkens et al. | |
| 6,221,973 B1 | 4/2001 | Arkens et al. | |
| 6,274,661 B1 | 8/2001 | Chen et al. | |
| 6,331,350 B1 | 12/2001 | Taylor | |
| 6,734,237 B1 | 5/2004 | Taylor | |
| 6,803,439 B2 | 10/2004 | Taylor | |
| 6,884,838 B2 | 4/2005 | Taylor et al. | |
| 6,933,349 B2 | 8/2005 | Chen et al. | |
| 7,067,579 B2 | 6/2006 | Taylor et al. | |
| 7,241,487 B2 | 7/2007 | Taylor et al. | |
| 7,285,504 B2 | 10/2007 | Jones et al. | |
| 7,592,049 B2 | 9/2009 | Jones et al. | |
| 8,591,643 B2 | 11/2013 | Obert et al. | |
| 8,865,816 B2 | 10/2014 | Zhang | |
| 2003/0045191 A1 | 3/2003 | Goldstein et al. | |
| 2004/0209539 A1 | 10/2004 | Confalone et al. | |
| 2006/0252855 A1 * | 11/2006 | Pisanova | C08K 5/04 524/47 |
| 2007/0191803 A1 | 8/2007 | Diehl et al. | |
| 2011/0312240 A1 | 12/2011 | Amthor et al. | |
| 2012/0061607 A1 | 3/2012 | McLennan et al. | |
| 2013/0023174 A1 * | 1/2013 | Quinn | C09D 103/02 442/327 |
| 2013/0319029 A1 | 12/2013 | Sekiya et al. | |
| 2014/0120348 A1 | 5/2014 | Didier et al. | |

FOREIGN PATENT DOCUMENTS

| | | |
|---|---|---|
| JP | 63182414 | 7/1998 |
| JP | 2011153395 A | 8/2011 |
| WO | 1996/015075 | 5/1996 |
| WO | 2005087837 A1 | 9/2005 |
| WO | 2008/145489 | 12/2008 |
| WO | 2010/006844 | 1/2010 |
| WO | 2011/157792 | 12/2011 |

OTHER PUBLICATIONS

Extend European Search Report from EP Application No. 1710818.9 dated Jan. 7, 2020.
Communication pursuant to Article 94(3) EPC from EP Application No. 1710818.9 dated Aug. 20, 2020.
Communication pursuant to Article 94(3) EPC from EP Application No. 17810818.9 dated Jan. 18, 2021.
Office Action from CN Application No. 201780042850.X dated Feb. 3, 2021.
Office Action from JP Application No. 2019-516094 dated May 27, 2021.

* cited by examiner

BINDER SYSTEM

RELATED APPLICATIONS

This application claims priority to and the benefit of U.S. Provisional Application No. 62/345,885, filed on Jun. 6, 2016, the content of which is hereby incorporated by reference in its entirety as if recited herein.

FIELD

The present invention relates generally to fibrous insulation and non-woven mats, and more particularly, to a binder for use in manufacturing fibrous insulation and non-woven mats.

BACKGROUND

Conventional fibers such as fiberglass, mineral wool, and basalt are useful in a variety of applications including reinforcements, textiles, and acoustical and thermal insulation materials. Fibrous insulation is typically manufactured by fiberizing a molten composition of polymer, glass, or other mineral and spinning fine fibers from a fiberizing apparatus, such as a rotating spinner. To form an insulation product, fibers produced by the rotating spinner are drawn downwardly from the spinner towards a conveyor by a blower. As the fibers move downward, a binder material is applied through spraying or dipping the fibers. The fibers are then collected into a high loft, continuous blanket on the conveyor. The binder material gives the insulation product resiliency for recovery after packaging and provides stiffness and handleability so that the insulation product can be handled and applied as needed, for example, in the insulation cavities of buildings. The binder composition also provides protection to the fibers from interfilament abrasion and promotes compatibility between the individual fibers.

The blanket containing the binder-coated fibers is then passed through a curing oven and the binder is cured to set the blanket to a desired thickness. After the binder has cured, the fiber insulation may be cut into lengths to form individual insulation products, and the insulation products may be packaged for shipping to customer locations. One typical insulation product produced is an insulation batt or blanket, which is suitable for use as wall insulation in residential dwellings or as insulation in the attic and floor insulation cavities in buildings. Another type of insulation product is an insulation board. Insulation boards may be used in a similar fashion to insulative batts or blankets, but are stiffer and generally more dense.

Non-woven mats, such as those used in acoustic ceiling boards, may be formed by conventional wet-laid processes. In one such process, wet chopped fibers are dispersed in a water slurry that contains surfactants, viscosity modifiers, defoaming agents, and/or other chemical agents. The slurry containing the chopped fibers is then agitated so that the fibers become more evenly dispersed throughout the slurry. The slurry containing the fibers is deposited onto a moving screen where a substantial portion of the water is removed to form a web. A binder is then applied, and the resulting mat is dried to remove any remaining water and cure the binder. The formed non-woven mat is an assembly of dispersed, individual glass filaments.

Non-woven mats may also be prepared from dry chopped fibers and/or continuous filaments. For example, fibers are dispensed from a bushing and are chopped to a desired length. The fibers may or may not have certain chemical agents applied prior to chopping. The chopped fibers are then applied to a surface, for example, a conveyor belt to form a mat. Binder is applied to the mat which is conveyed to a curing oven.

In the context of continuous filament fiber products, a fiber is dispensed to a surface (either with or without chemical agents applied first) and is allowed to form a mat. A binder composition is then applied to the mat which is then conveyed to an oven for cure. Generally, the cured mat is thus comprised of fewer fibers than a chopped fiber mat.

Various attempts have been made to reduce undesirable formaldehyde emissions from formaldehyde-based resins such as phenolic resins. For example, various formaldehyde scavengers such as ammonia and urea have been added to the formaldehyde-based resin in an attempt to reduce formaldehyde emission from the insulation product.

Polyacrylic acid binders offer some benefits over phenolic resins. However, a binder that is formed mostly of polyacrylic acid inherently has problems due to its acidity and associated corrosion of machine parts. In addition, polyacrylic acid binders have a high viscosity, high curing temperatures, and high associated curing costs. Certain natural-based systems are known as well, but suffer from particular drawbacks of their own. For example, the starch/carbohydrate based products (or those that rely on the Maillard reaction) may have an undesirable dark brown color after curing. Also, the use of large amounts of ammonia needed to make the binder presents a safety risk and possible emission problems.

Alternative polymeric binder systems to those described above for fibrous glass products have also been proposed. However, these alternative polymeric binder systems remain problematic in certain instances. For example, low molecular weight, low viscosity binders which allow maximum vertical expansion of the insulation pack in the transfer zone generally cure to form a non-rigid plastic matrix in the finished product, thereby reducing the attainable vertical height recovery of the finished insulation product when installed. Conversely, high viscosity binders, which generally cure to form a rigid matrix in the finished product, do not allow the desired maximum vertical expansion of the coated, uncured pack.

In addition to the components that react to bind the fibers together, most conventional binder systems comprise a number of other components to adjust various properties of the finished product (e.g., anti-dust, anti-static). Each of these individual components must be verified as safe and compatible with the other components, in addition to not interfering with ultimate binding of the fibers.

In view of the existing problems with current binders, there remains a need in the art for a binder system that does not corrode machine parts, does not include added formaldehyde, is environmentally friendly, is shelf stable after production, is simpler in terms of total ingredients required to produce a finished product, and/or provides processing advantages.

SUMMARY

The general inventive concepts relate to a binder composition for use in the formation of insulation, insulation boards, non-woven mats, carbon fiber products, and for use in products as a binder for organic fibers such as cellulose and wood-based fibers. Generally, the binder includes a metal salt and a polyol. In certain embodiments, the metal salt and the polyol are present in the binder composition in a weight ratio of 1:99 to 1:1.

In certain embodiments, the general inventive concepts relate to a fibrous insulation product that includes a plurality of randomly oriented fibers and a binder composition applied to at least a portion of the fibers and interconnecting the fibers. The binder includes a metal salt and a polyol in a weight ratio of 1:99 to 1:1.

In certain embodiments, the general inventive concepts relate to a non-woven mat formed of a plurality of randomly oriented fibers having a discrete length enmeshed in the form of a mat having a first major surface and a second major surface and a binder composition at least partially coating the first major surface of the mat, or in certain embodiments, at least partially impregnating the mat. The binder includes a metal salt and a polyol. The metal salt and the polyol are generally present in a weight ratio of 1:99 to 1:1. Any suitable fibers may be used. In certain embodiments, the fibers are glass fibers. The fibers have an average diameter within the range of 6.5 microns to 24 microns. In certain embodiments, the fibers are mineral wool fibers. The binder composition is present in the non-woven mat in an amount of 1% to 25% loss on ignition.

In certain embodiments, the general inventive concepts relate to a method of making a fibrous insulation product. The method comprises forming a fibrous blanket including a plurality of randomly oriented fibers, applying a binder composition to at least a portion of the glass fibers, the binder composition comprising a metal salt and a polyol in a weight ratio of 1:99 to 1:1, passing the fibrous blanket through an oven to at least partially cure the binder on the fibers and form an insulation product, wherein the binder composition is present in the fibrous insulation product in an amount of 1% to 25% loss on ignition.

Various embodiments of the general inventive concepts will typically exhibit one or more of the following exemplary features.

It is a feature of the general inventive concepts that the inventive binder composition is free from added formaldehyde.

It is a feature of the general inventive concepts that the inventive binder composition requires fewer ingredients to generate a satisfactory product.

It is a feature of the general inventive concepts that insulation products and non-woven mats utilizing the inventive binder composition can be manufactured using current manufacturing lines, thereby saving time and money. In certain embodiments, insulation products and non-woven mats utilizing the inventive binder composition can be produced at lower temperatures than those typically used to cure conventional binder systems and still maintain overall performance standards.

It is a feature of the general inventive concepts that insulation products and non-woven mats utilizing the inventive binder composition can be manufactured using increased amounts of added water and be cured at or below current temperatures/times. This is due to the surprising ability of the inventive binder compositions to "shed" excess water in a manner not seen with conventional binder systems, allowing additional water to be added to the binder compositions (for ease in processing), if necessary, without substantially increasing production time or cost and without substantially affecting performance.

It is a feature of the general inventive concepts that a final insulation product made with the exemplary aqueous binder compositions provided herein has a light color at desired loss on ignition (LOI) levels that allows the use of dyes, pigments, or other colorants to yield a variety of colors for the insulation product.

It is a feature of the general inventive concepts that the inventive binder compositions bind mineral wool under acidic conditions. Generally speaking, binders that require an acidic environment to properly crosslink/cure are ineffective or have reduced performance when binding mineral wool. It was surprisingly found that the inventive binders described herein were effective at binding mineral wool to form an insulative batt at a pH of 1 to 4.5, including a pH of 2.5 to 3.

In certain embodiments, the inventive binder composition may be cured at a lower temperature than conventional binder compositions. A binder composition comprising a polyol and a metal salt may allow water to more-readily release from the pre-cured product. The reduced water content thereby requires less heat to drive excess water from the product during the cure process.

It is a feature of the general inventive concepts that the binder composition (e.g., polyvinyl alcohol and a metal salt) can form an aqueous mixture that can be applied by conventional binder applicators, including spray applicators.

It is also a feature of the general inventive concepts that the inventive binder composition can be useful for making mats containing composite reinforcements.

The foregoing and other objects, features, and advantages of the general inventive concepts will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

Various exemplary advantages of this invention will be apparent upon consideration of the following detailed disclosure of the invention, especially when taken in conjunction with the accompanying drawings wherein.

DETAILED DESCRIPTION

Figure 1:
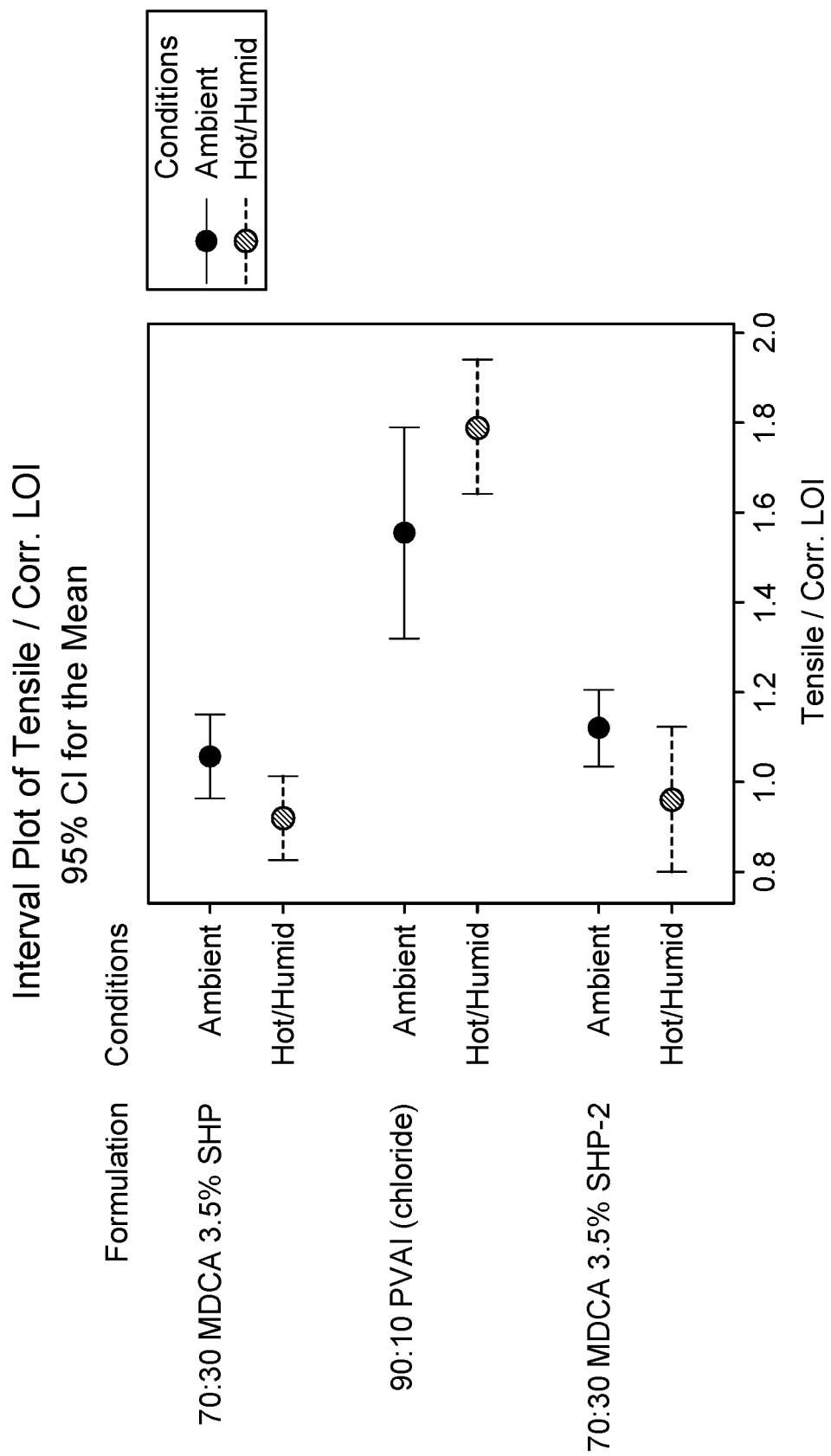
FIG. 1 is a graph showing the tensile strength divided by the corrected LOI (tensile strength/Corr. LOI) for handsheet samples made with several binder compositions.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in its entirety, including all data, tables, figures, and text presented therein.

It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. The terms "top," "bottom," "side," and the like are used herein for the purpose of explanation only. Like numbers found throughout the figures denote like elements.

The terminology as set forth herein is for description of the exemplary embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both."

All percentages, parts, and ratios as used herein are by weight of the total composition, unless otherwise specified. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The various embodiments of the compositions described herein may also be substantially free of any optional or selected component or feature described herein, provided that the remaining compositions still contain all of the necessary components or features as described herein. In this context, and unless otherwise specified, the term "substantially free" means that the selected binder compositions contain less than a functional amount of the optional ingredient, typically less than 1%, including less than 0.5%, including less than 0.1%, and also including zero percent, by weight of such optional or selected essential ingredient.

The compositions described herein may comprise, consist of, or consist essentially of the essential elements of the products and methods as described herein, as well as any additional or optional element described herein or otherwise useful in binder applications or related applications.

The general inventive concepts relate to more environmentally friendly binder compositions. In certain embodiments, the binder is an aqueous binder composition. The binder composition typically will be comprised of a metal salt and polyol. The binder may be used to form products including fibers such as fiberglass, mineral wool, carbon fiber, and organic fibers including cellulose and wood-based fibers.

In certain exemplary embodiments, the inventive binder includes at least one polyol. In certain exemplary embodiments, the polyol includes compounds such as aliphatic alcohols, glycerol, triethanolamine, ethylene glycol, polyethylene glycol, unmodified polyvinyl alcohol, modified polyvinyl alcohol, a copolymer of polyvinyl alcohol, polyvinyl acetate, and polyacrylic acid. In certain exemplary embodiments, the polyol may be a polymeric alcohol. The term polyol as used herein is intended to refer to compounds having an aliphatic or aromatic backbone and at least two hydroxyl functional groups. However, it should be understood that other functional groups may also be present in addition to the hydroxyl functional groups, or in certain embodiments, other functional groups may replace one or more of the hydroxyl functional groups so long as the functional groups would be expected to interact with the glass surface and the metal salt in a similar fashion. Thus, the term polyol, in certain embodiments, may refer to compounds that have few or no hydroxyl functional groups, but which are related to polyols and retain a similar interaction, such as, for example, polyvinyl acetate, polyacrylic acid, and modified polyvinyl alcohol. The terms "polyol" and "polymeric alcohol" are used interchangeably herein and refer to chemical compounds having at least two hydroxyl functionalities. While the terms refer to compounds by the particular functional group, those of ordinary skill in the art will recognize that a wide variety of other functional groups may be present in the compounds so long as the other groups do not impede or substantially interfere with the general inventive concepts discussed herein.

In certain exemplary embodiments, the binder composition is free from added formaldehyde.

In certain exemplary embodiments, the fibrous insulation products and non-woven mats utilizing the inventive binder composition can be manufactured using existing manufacturing lines, thereby saving time and money.

In certain exemplary embodiments, a final insulation product made with exemplary binder compositions provided herein has a light color at desired loss on ignition (LOI) levels that allows the use of dyes, pigments, or other colorants to yield a variety of colors for the insulation product.

In certain exemplary embodiments, the binder composition (e.g., polyvinyl alcohol having a degree of hydrolysis of at least 50% and an aluminum salt) can form an aqueous mixture that can be applied by conventional binder applicators, including spray applicators.

In certain exemplary embodiments, the binder composition is used in the formation of insulation (e.g., insulative batts), insulation boards, non-woven mats, carbon fiber products, and for use in products as a binder for organic fibers such as cellulose and wood-based fibers. Generally, the binder includes a metal salt and a polyol.

In certain exemplary embodiments, the general inventive concepts relate to a fibrous insulation product that includes a plurality of fibers and a binder composition applied to at least a portion of the fibers and interconnecting the fibers. In certain exemplary embodiments, the fibers are randomly oriented.

In certain exemplary embodiments, the general inventive concepts relate to a non-woven mat formed of a plurality of randomly oriented glass fibers having been chopped to a discrete length enmeshed in the form of a mat having a first major surface and a second major surface and a binder composition at least partially coating, or in certain embodiments, at least partially impregnating the first major surface of the mat.

In certain exemplary embodiments, the general inventive concepts relate to a non-woven mat formed of a plurality of randomly oriented glass fibers enmeshed in the form of a mat having a first major surface and a second major surface and a binder composition at least partially coating, or in certain embodiments, at least partially impregnating the first major surface of the mat.

In certain exemplary embodiments, the general inventive concepts relate to a non-woven mat formed of a plurality of randomly oriented mineral wool fibers in the form of a mat having a first major surface and a second major surface and a binder composition at least partially coating, or in certain embodiments, at least partially impregnating the first major surface of the mat.

In certain exemplary embodiments, the binder composition comprises at least one metal salt. In certain exemplary embodiments, the metal is at least one of a group 13 element, a post-transition metal, a metalloid, or any other metal that readily coordinates oxygen. In certain embodiments, the metal is selected from boron, aluminum, gallium, indium, tin, thallium, lead, bismuth, zinc, iron, zirconium, and titanium. In certain embodiments, the metal salt may comprise more than one metal, such as, for example, a combination or complex of aluminum and zirconium. In certain exemplary embodiments, the metal salt is comprised of at least one salt of aluminum. In certain exemplary embodiments, the metal salt is selected from the group consisting of aluminum chloride, aluminum nitrate, aluminum sulfate, aluminum phosphate monobasic, sodium aluminate, and combinations thereof.

In certain embodiments, the polyol is a polymeric alcohol, including a water miscible synthetic polymeric alcohol. In certain embodiments, the polyol is a water soluble polymeric alcohol such as a polyvinyl alcohol.

Polyvinyl Alcohol (PV) =

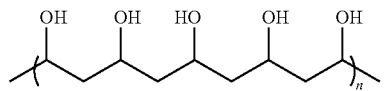

Those of skill in the art will understand that PV (alternatively, PVOH) generally refers to the class of compounds that result from hydrolysis of the ester functional groups of polyvinyl acetate. While other materials may be used to form a polyvinyl alcohol, generally, PV is manufactured by polymerization of vinyl acetate to polyvinyl acetate. The polyvinyl acetate is then subjected to hydrolysis to render a PV having a desired degree of hydrolysis (relative to the polyvinyl acetate polymer). Thus, while PVs having varying degrees of hydrolysis are referred to as polyvinyl alcohol, those of skill in the art will recognize that the term polyvinyl alcohol refers to a "copolymer" comprised of acetate moieties and alcohol moieties, with the exact composition determined by the degree of hydrolysis.

One way of characterizing PV is by reference to the degree to which it is hydrolyzed. In certain embodiments, the PV has a degree of hydrolysis of at least 50%. In certain embodiments, the PV has a degree of hydrolysis of 50% to 98% or more. In certain embodiments, the PV has a high degree of hydrolysis, including polymers that are 75% hydrolyzed, including 80% hydrolyzed, including 85% hydrolyzed, including 90% hydrolyzed, including 95% hydrolyzed, including 98% hydrolyzed, including 99% hydrolyzed or more.

In certain exemplary embodiments, the PV may be modified after hydrolysis. In certain exemplary embodiments, the polyol is an unmodified PV. Unmodified PV may be considered a polyvinyl acetate that has been hydrolyzed to make PV and is used without further modification of the hydroxyl groups of the polymer. Modified polyvinyl alcohol is a PV that has been reacted to modify at least a portion of the pendant functional groups remaining after primary hydrolysis to form the PV. PV may be modified (e.g., grafted) with silanes or acids to form a copolymer. In certain embodiments, the polyol is a modified polyvinyl alcohol.

Another way of characterizing a PV is by the measured viscosity of a solution containing a certain percentage of the PV. The viscosity of PV may be measured by making a 4% solution of PV and measuring the viscosity using a Hoeppler falling-ball viscometer at ambient temperature (i.e., approximately 20° C.). In certain exemplary embodiments, the PV has a viscosity of 3 centipoise. In certain exemplary embodiments, the PV has a viscosity of 4 centipoise. In certain exemplary embodiments, the PV has a viscosity of 5 centipoise.

While not wishing to be bound by theory, it is believed that a metal salt may form a coordination complex between the hydroxyl functionalities of, for example, glass (e.g., fiberglass) and the hydroxyl groups of a polyol (e.g., polyvinyl alcohol) as illustrated below. In addition, during heating, the metal ion may catalyze reactions between the glass fibers and the polyol to form covalent bonds between the two, or to "crosslink" adjacent polyol molecules. Below is a representative diagram illustrating one possible interaction between aluminum, a glass surface, and a polyol (e.g., polyvinyl alcohol). In addition, the aluminum may also interact with adjacent polyol molecules (as shown below right) further increasing the overall strength of the fibrous material.

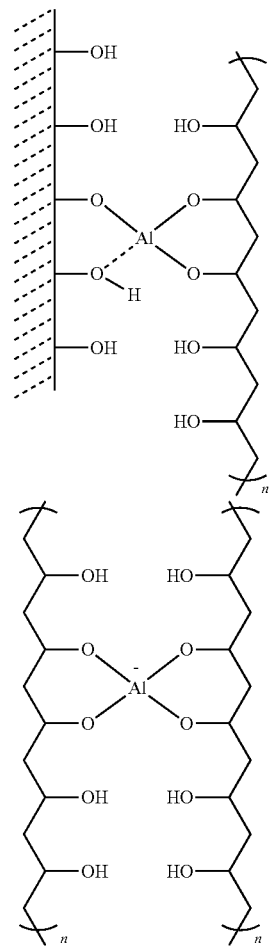

This coordination or crosslinking may aid in formation of three-dimensional networks between the individual components, providing additional bond strength to the finished product (e.g., insulative batts or boards). Boron, which is electronically similar in valence to aluminum, forms an insoluble gel when combined with PV in an aqueous medium. It was surprisingly found that the combination of an aluminum salt (e.g., aluminum nitrate) and PV demonstrated no such gelling and, in fact, resulted in an aqueous mixture that was suitable for application to glass fibers and mineral wool as a binder composition, even after storage of the mixture for a significant amount of time.

Notwithstanding the proposed mechanism of interaction, while the above discussion relates to the interaction between the inventive binder and the surface of a glass substrate, the inventive binder compositions may similarly bind other materials (e.g., mineral wool or slag wool), including those without hydroxyl functional groups on the surface.

In certain exemplary embodiments, the metal salt and the polyol are present in the aqueous binder composition in a particular weight ratio to one another. In certain exemplary embodiments, the metal salt and the polyol are present in the binder composition in a weight ratio of 1:99 to 1:1. In certain exemplary embodiments, the metal salt and the polyol are present in the binder composition in a weight ratio of 1:50 to 1:1. In certain exemplary embodiments, the metal salt and the polyol are present in the binder composition in a weight ratio of 1:20 to 1:1. In certain exemplary embodiments, the metal salt and the polyol are present in the binder composition in a weight ratio of 1:10 to 1:1. In certain exemplary embodiments, the metal salt and the polyol are present in the binder composition in a weight ratio of 1:9 to 1:1. In certain exemplary embodiments, the metal salt and the polyol are present in the binder composition in a weight ratio of 1:4 to 1:1. In certain exemplary embodiments, the metal salt and the polyol are present in the binder composition in a weight ratio of 3:7 to 1:1. In certain exemplary embodiments, the metal salt and the polyol are present in the binder composition in a weight ratio of 2:3 to 1:1. In certain exemplary embodiments, the metal salt and the polyol are present in the binder composition in a weight ratio of 1:4 to 3:7. In certain exemplary embodiments, the metal salt and the polyol are present in the binder composition in a weight ratio of 1:4 to 2:3.

In certain exemplary embodiments, the binder composition is present in a fibrous insulation product or a non-woven mat in an amount of 1% to 25% loss on ignition (LOI). The term loss on ignition refers to a process of heating a product to pyrolyze a binder, driving off materials that are combustible. For example, a fibrous insulation product may be prepared according to certain methods described herein. The product is then subjected to high heat to remove any pyrolyzable material, leaving behind, for example, a fiberglass substrate and any materials that might not be expected to pyrolyze. The amount of weight lost during this process is then reported as a percentage of the original weight of the product (i.e., the LOI). In certain exemplary embodiments, the loss on ignition value is corrected after primary measurement to account for non-combustible materials, such as metal salts from a binder.

In certain exemplary embodiments, the binder composition may optionally comprise additional components including, but not limited to, one or more of a secondary binder composition, a crosslinking agent, a coupling agent, a moisture resistant agent, a dust suppression agent, a catalyst, an inorganic acid or base, and an organic acid or base. The binder composition is free of added formaldehyde and, thus, is generally more environmentally friendly than a similar formaldehyde-containing binder.

In addition, in certain exemplary embodiments, the binder may optionally contain conventional additives such as, but not limited to, one or more of corrosion inhibitors, dyes, pigments, fillers, colorants, UV stabilizers, thermal stabilizers, anti-foaming agents, anti-oxidants, emulsifiers, preservatives (e.g., sodium benzoate), biocides, and fungicides. Other additives may be added to the binder composition for the improvement of process and/or product performance. Such additives include lubricants, wetting agents, surfactants, antistatic agents, and/or water repellent agents. Additives may be present in the binder composition from trace amounts (such as < about 0.1% by weight the binder composition) up to about 10% by weight of the total solids in the binder composition. In certain embodiments, the additives are present in an amount from about 0.1% to about 5% by weight of the total solids in the binder composition, from about 1% to about 4% by weight, or from about 1.5% to about 3% by weight.

The binder compositions further include water to dissolve or disperse the active solids for application onto the fibers. Water may be added in an amount sufficient to dilute the aqueous binder composition to a viscosity that is suitable for its application to the fibers and to achieve a desired solids content on the fibers. In particular, the binder composition may contain water in an amount from about 50% to about 98% by weight of the binder composition. In certain exemplary embodiments, the binder composition comprises water in an amount of greater than 60% by weight of the binder composition. In certain exemplary embodiments, the binder composition comprises water in an amount of greater than 70% by weight of the binder composition. In certain exemplary embodiments, the binder composition comprises water in an amount of greater than 80% by weight of the binder composition. In certain exemplary embodiments, the binder composition comprises water in an amount of greater than 90% by weight of the binder composition, including 90% to 97% by weight of the binder composition.

In an exemplary embodiment, the binder composition is used to form an insulation product. In general, fibrous insulation products are formed of matted inorganic fibers (e.g., fiberglass) bonded together by a cured thermoset polymeric material. Examples of suitable inorganic fibers include glass wool, stone wool, slag wool, mineral wool, and ceramic. Optionally, other reinforcing fibers such as natural fibers and/or synthetic fibers (e.g., carbon fibers, polyester, polyethylene, polyethylene terephthalate, polypropylene, polyamide, aramid, and/or polyaramid fibers) may be present in the insulation product in addition to, or instead of, the glass fibers or mineral wool, for example. The term "natural fiber" as used herein refers to plant fibers extracted from any part of a plant, including, but not limited to, the stem, seeds, leaves, roots, or phloem. Insulation products may be formed entirely of one type of fiber, or they may be formed of a combination of two or more different types of fibers. For example, the insulation product may be formed of combinations of various types of glass fibers or various combinations of different inorganic fibers and/or natural fibers depending on the desired application for the insulation. The embodiments described herein are with reference to insulation products formed entirely of glass fibers.

The manufacture of glass fiber insulation may be carried out in a continuous process by fiberizing molten glass, immediately forming a fibrous glass batt on a moving conveyor, and curing a binder applied on the fibrous glass batt to form an insulation blanket. Glass may be melted in a tank and supplied to a fiber forming device such as a fiberizing spinner. The spinner is rotated at high speeds. Centrifugal force causes the molten glass to pass through holes in the circumferential sidewalls of the fiberizing spinner to form glass fibers. Glass fibers of random lengths may be attenuated from the fiberizing spinner and blown generally downward by blowers positioned within a forming chamber. The blowers turn the fibers downward to form a fibrous batt. Those of skill in the art will understand that the glass fibers may have a variety of diameters based on the intended use of the final product.

The glass fibers, while in transit in the forming chamber and while still hot from the drawing operation, are sprayed with the inventive aqueous binder composition. Water may also be applied to the glass fibers in the forming chamber.

The glass fibers having the uncured resinous binder adhered thereto may be gathered and formed into an uncured insulation pack on a forming conveyor within the forming chamber with the aid of a vacuum drawn through the fibrous pack from below the forming conveyor.

The coated fibrous pack, which is in a compressed state due to the flow of air through the pack in the forming chamber, is then transferred out of the forming chamber to a transfer zone where the pack vertically expands due to the resiliency of the glass fibers. The expanded insulation pack is then heated in a curing oven where heated air is blown through the insulation pack to evaporate any remaining water in the binder, cure the binder, and rigidly bond the fibers together. The insulation pack may be compressed to form a fibrous insulation blanket. It is to be appreciated that the insulation blanket has an upper surface and a lower surface. In certain embodiments, the pack may be compressed to any one of a variety of densities.

A facing material may then be placed on the insulation blanket to form a facing layer. Non-limiting examples of suitable facing materials include Kraft paper, a foil-scrim-Kraft paper laminate, recycled paper, and calendared paper. The facing material may be adhered to the surface of the insulation blanket by a bonding agent to form a faced insulation product. Suitable bonding agents include adhesives, polymeric resins, asphalt, and bituminous materials that can be coated or otherwise applied to the facing material. The faced fibrous insulation may subsequently be rolled for storage and/or shipment. In certain embodiments, the faced fibrous insulation may be cut into predetermined lengths by a cutting device prior to packaging. Such faced insulation products may be used, for example, as panels in basement finishing systems, as duct wrap, duct board, as faced residential insulation, and as pipe insulation.

In an exemplary embodiment, the inventive binder composition may be used to form a non-woven mat. In particular, the binder is added during the formation of a chopped strand mat in a wet-laid mat processing line. Chopped glass fibers may be provided to a conveying apparatus from a storage container for conveyance to a mixing tank that contains various surfactants, viscosity modifiers, defoaming agents, and/or other chemical agents with agitation to disperse the fibers and form a chopped glass fiber slurry. The glass fiber slurry may be transferred to a head box where the slurry is deposited onto a conveying apparatus such as a moving screen or foraminous conveyor and a substantial portion of the water from the slurry is removed to form a web (mat) of enmeshed fibers. In certain exemplary embodiments, the water may be removed from the web by a conventional vacuum or air suction system. It is to be appreciated that while reference is made herein to glass fibers or glass wool, the mat could be formed of, or include, non-glass fibers such as mineral wool. Those of ordinary skill in the art will understand that, while insulation products comprising materials other than glass fibers will have certain necessary changes in the details of forming an insulation product, these changes will still fall within the general inventive concepts described herein.

The inventive binder is applied to the web by a suitable binder applicator, such as a spray applicator or a curtain coater. Once the binder has been applied to the mat, the binder coated mat is passed through at least one drying oven to remove any remaining water and cure the binder composition. The formed non-woven mat that emerges from the oven is an assembly of randomly oriented, dispersed, individual glass fibers. The chopped strand mat may be rolled onto a take-up roll for storage for later use. Exemplary uses of the non-woven mat, include but are not limited to, roofing, flooring applications, ceiling applications, wall applications, as filters, in ground based vehicles, and in aircraft.

Having generally described the invention, a further understanding can be obtained by reference to certain specific examples illustrated below which are provided for purposes of illustration only and are not intended to be all inclusive or limiting unless otherwise specified.

EXAMPLES

Example 1

A binder composition comprising a mixture of polyvinyl alcohol (PV) and aluminum chloride ($AlCl_3$) (together PVAl) in a weight ratio of 90:10 was compared to a control binder composition comprising a mixture of maltodextrin and citric acid in a weight ratio of 70:30 (MDCA) (including 3.5% sodium hypophosphite). Unless otherwise indicated, the total solids are kept constant across the binder compositions. The binders were utilized to form handsheets in the manner described in detail below. The nonwoven fiberglass handsheets were dried and cured for three minutes at 475° F. The tensile strength, the LOI, and the tensile strength divided by the corrected LOI (tensile strength/Corr. LOI) for each sample were determined under ambient and hot/humid conditions and the results are shown in FIG. 1. The LOI of the reinforcing fibers is the reduction in weight of the fiberglass product after heating them to a temperature sufficient to burn or pyrolyze the organic portion of the binder from the fibers. The corrected LOI corrects for the presence of aluminum salts from the binder that would not be expected to pyrolyze. Hot/humid conditions include placing the samples in an autoclave at 90° F. and 90% humidity for 30 minutes. From these results, it was demonstrated that the inventive binder comprising polyvinyl alcohol and aluminum chloride could produce an effective fiberglass binder.

Example 2

Figure 2:
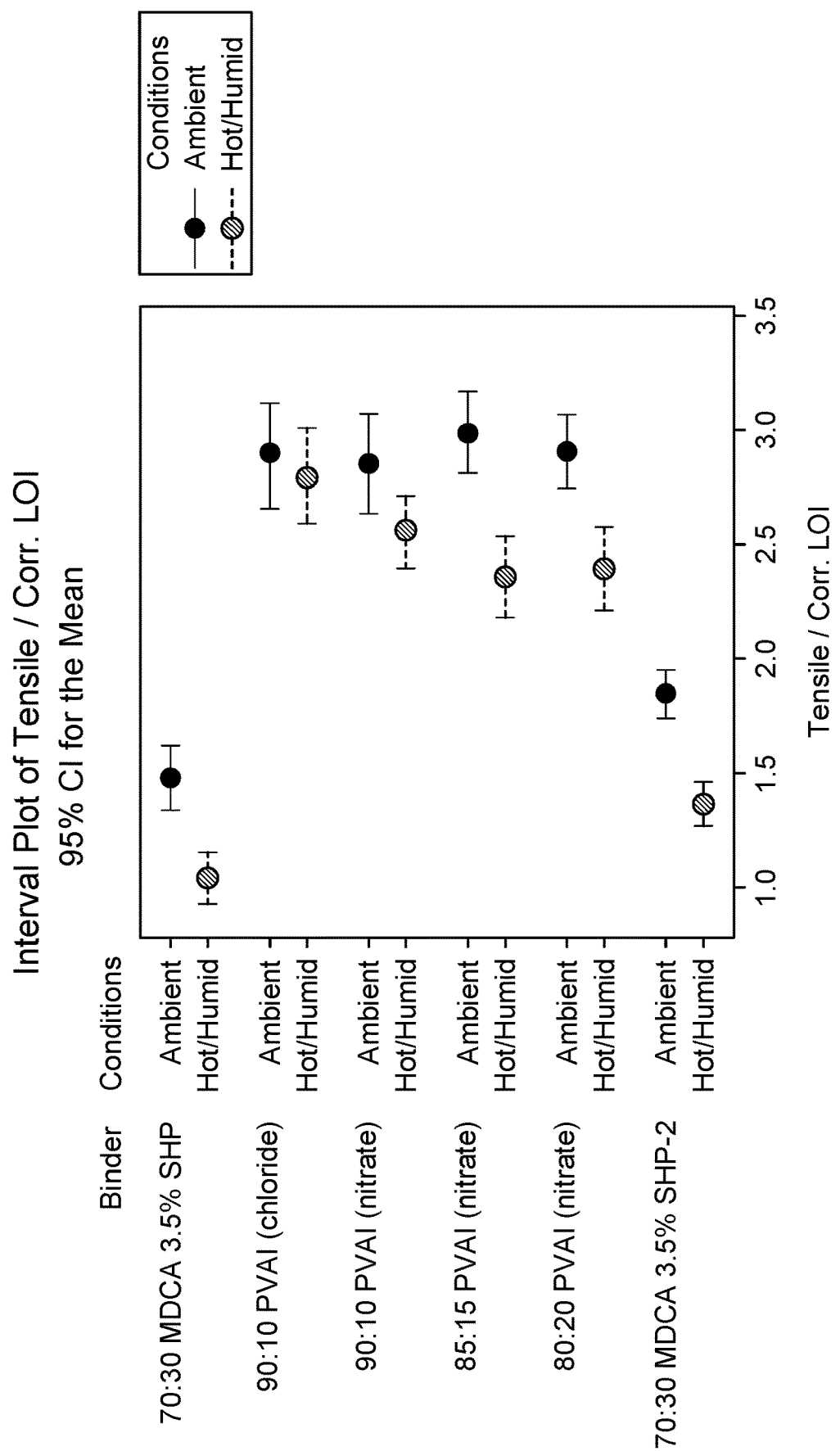
FIG. 2 is a graph showing the tensile strength divided by the corrected LOI (tensile strength/Corr. LOI) for handsheet samples made with several binders including inventive binder compositions comprising polyvinyl alcohol/aluminum chloride and polyvinyl alcohol/aluminum nitrate.

FIG. 2 shows the results of tensile strength measurements of handsheets made with several binder compositions. The graph shows first and second control binder results at the top and bottom of the graph. A PV and $AlCl_3$ (90:10) was compared to several binders including polyvinyl alcohol and aluminum nitrate $Al(NO_3)_3$ (i.e., 90:10, 85:15, and 80:20). The handsheets were cured for three minutes at 400° F. The samples were then tested according to the procedures described in Example 1. From the data set forth in FIG. 2, it was concluded that the binder compositions combining polyvinyl alcohol and aluminum salts achieved good performance on handsheets.

Example 3

Figure 3:
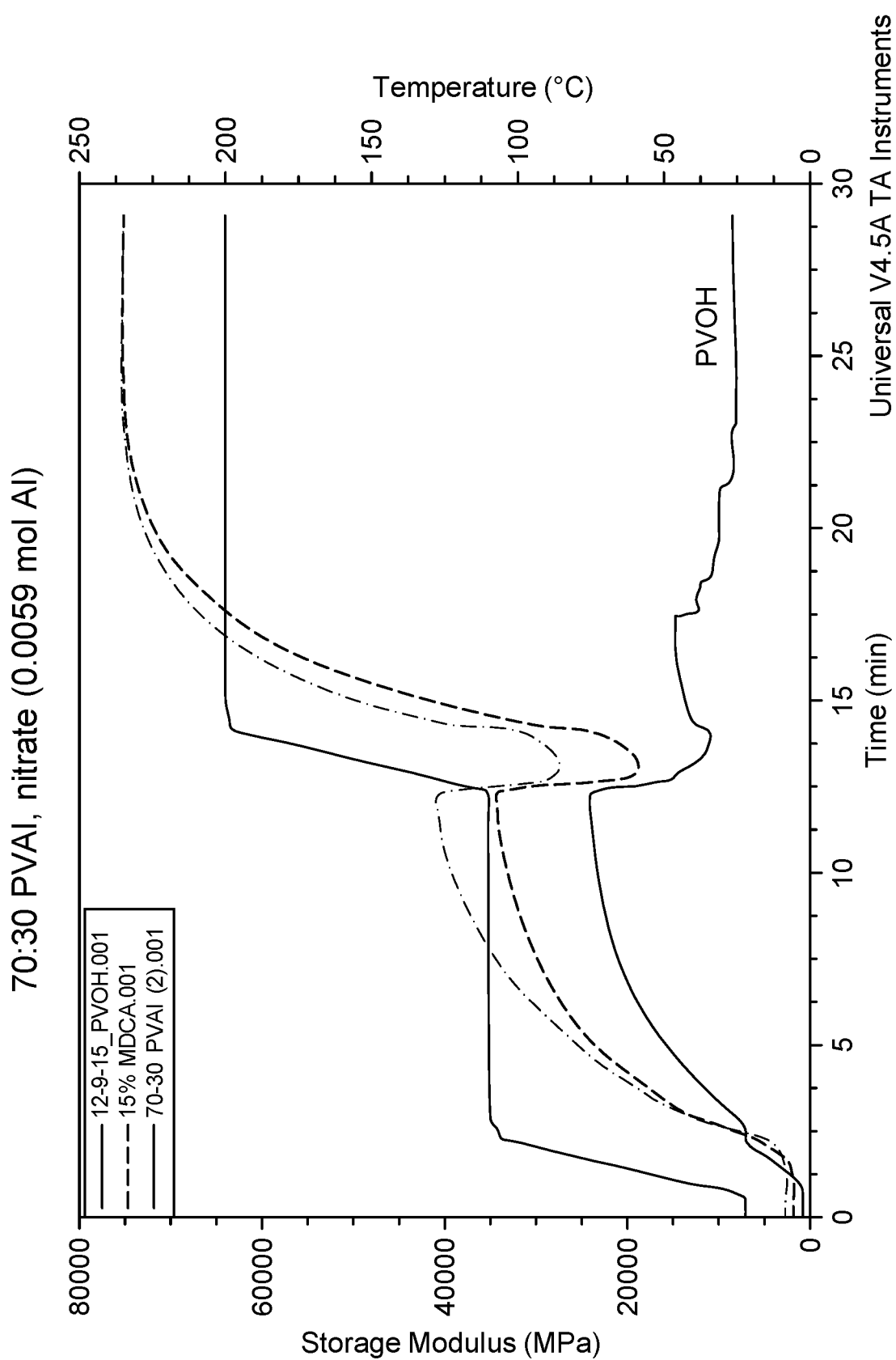
FIG. 3 is a graph showing the dynamic mechanical analysis of several binder compositions including an inventive binder comprising polyvinyl alcohol/aluminum nitrate.

FIG. 3 is a graph showing the dynamic mechanical analysis of polyvinyl alcohol alone (PVOH), and a binder comprising PV and $Al(NO_3)_3$ in a weight ratio of 70:30 (70-30 PVAl), compared to a control MDCA binder (including 3.5% sodium hypophosphite). It can be seen from the graph that the inventive binder performs much better than polyvinyl alcohol alone and similar to the control binder. From the data set forth in FIG. 3, it was concluded that the binder compositions combining polyvinyl alcohol and aluminum salts achieved good performance for dynamic mechanical analysis.

Example 4

Figure 4:
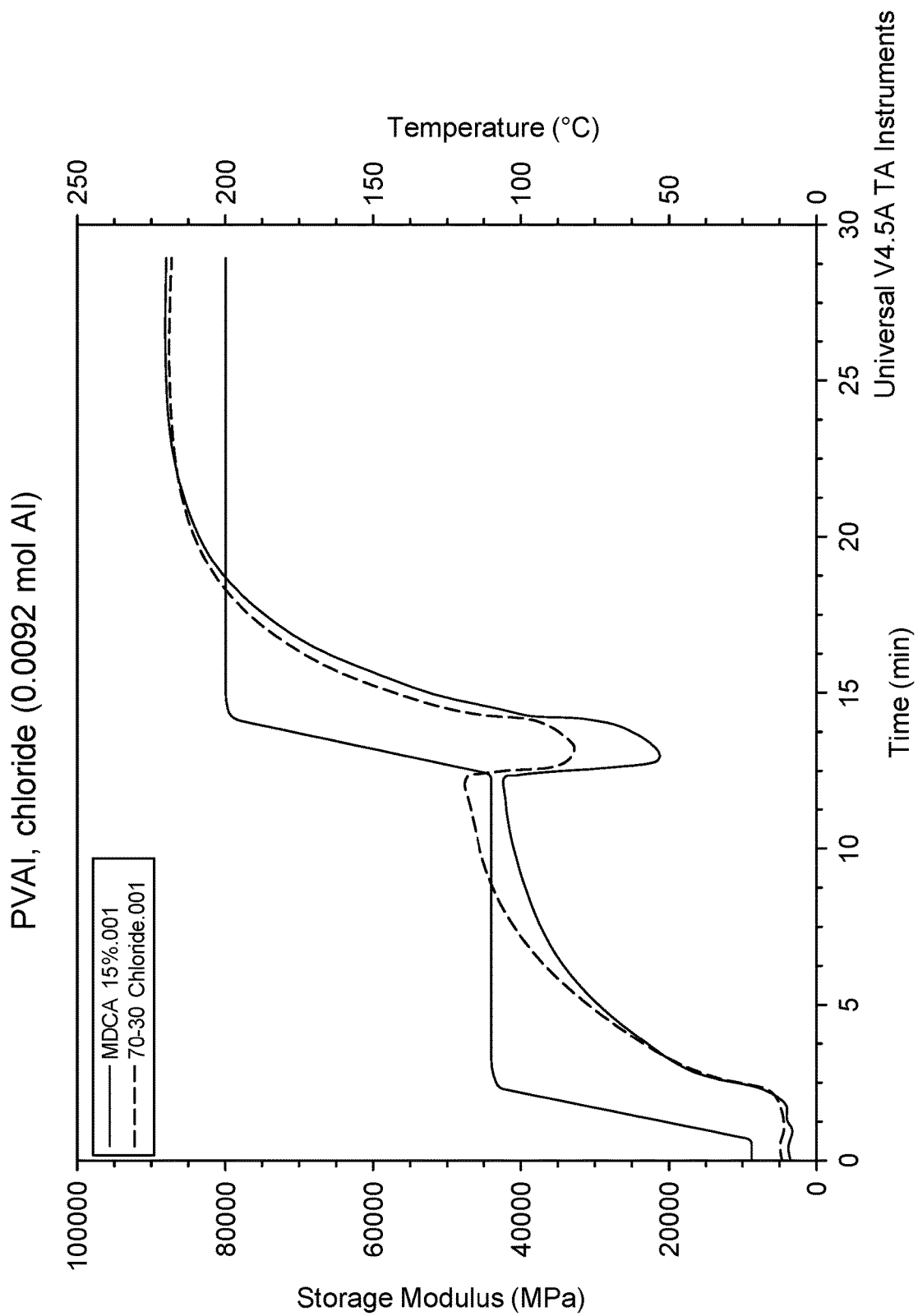
FIG. 4 is a graph showing the dynamic mechanical analysis of several binder compositions including an inventive binder comprising polyvinyl alcohol/aluminum chloride.

FIG. 4 is a graph showing the dynamic mechanical analysis of a binder comprising PV and $AlCl_3$ in a weight ratio of 70:30 (labeled 70-30 Chloride) compared to a control MDCA binder. It can be seen from the graph that the inventive binder performs similar to the control binder.

Example 5

Figure 5:
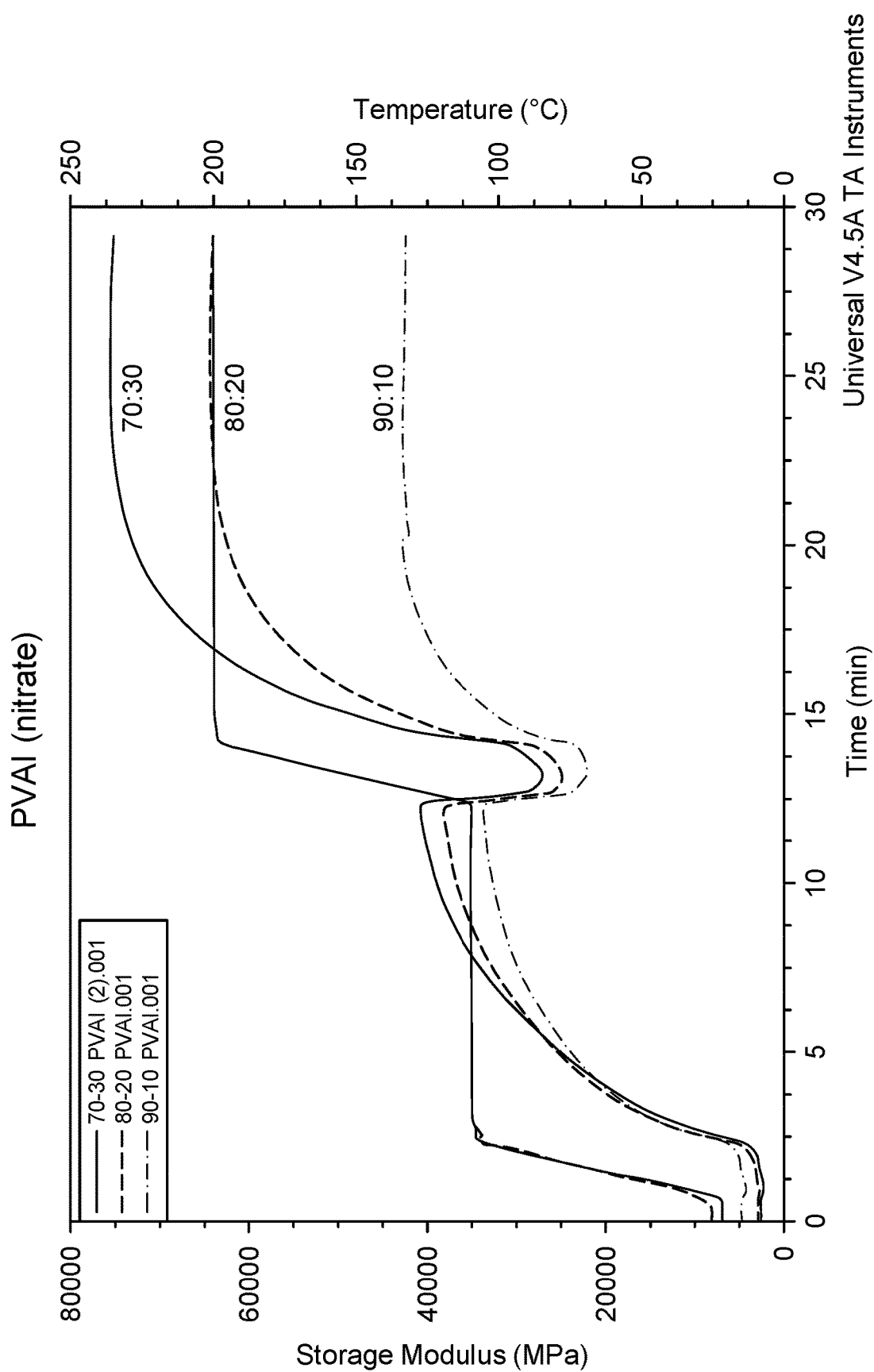
FIG. 5 is a graph showing the dynamic mechanical analysis of several binder compositions comprising polyvinyl alcohol/aluminum nitrate.

FIG. 5 is a graph showing the dynamic mechanical analysis of three binder compositions comprising PV and $Al(NO_3)_3$ in weight ratios of 70:30, 80:20, and 90:10, respectively. The graph shows an improvement in storage modulus with increasing $Al(NO_3)_3$ content.

Example 6

Figure 6:
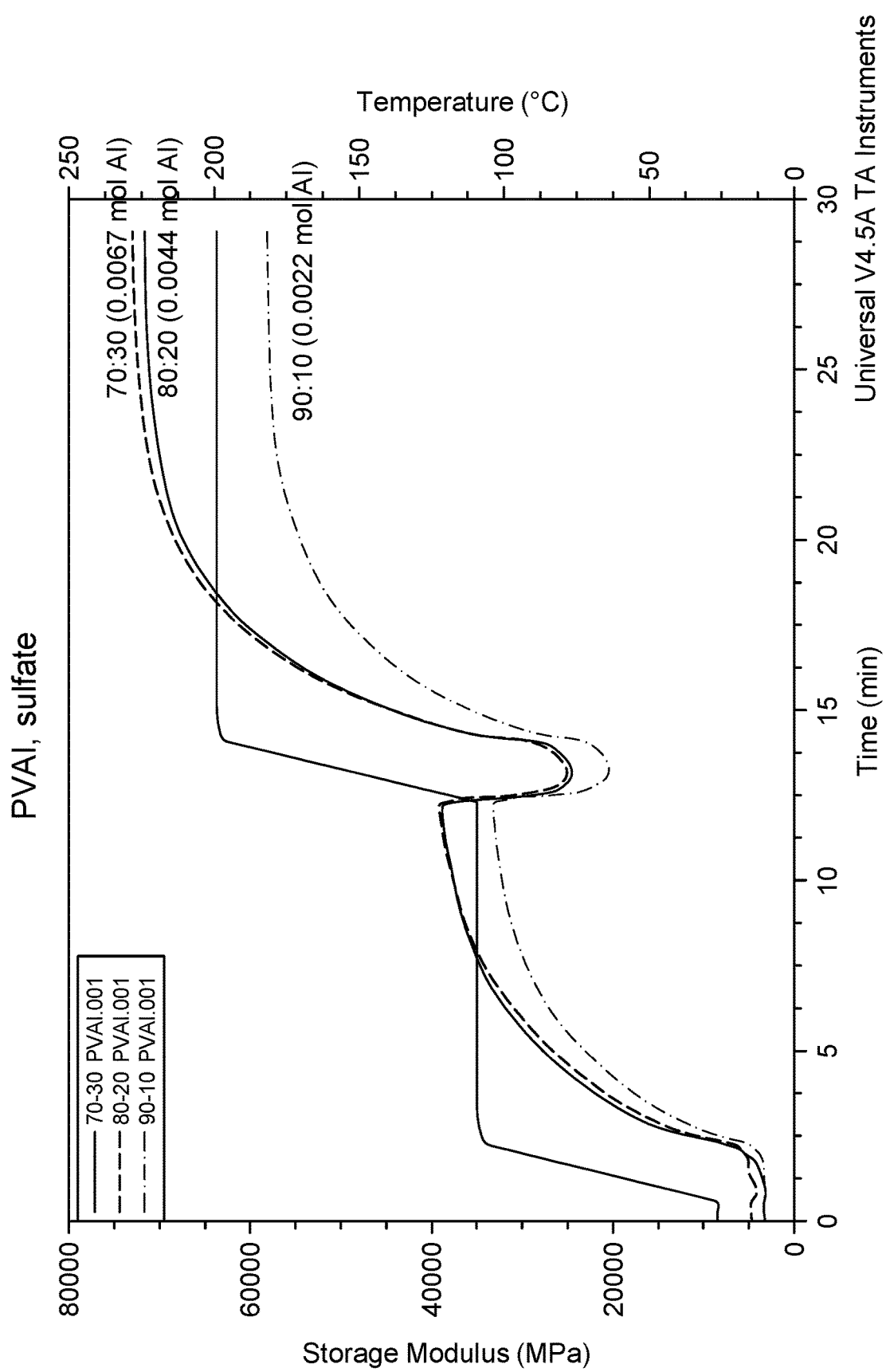
FIG. 6 is a graph showing the dynamic mechanical analysis of several binder compositions comprising polyvinyl alcohol/aluminum sulfate.

FIG. 6 is a graph showing the dynamic mechanical analysis of three binder compositions comprising PV and aluminum sulfate $(Al_2(SO_4)_3)$ in a weight ratio of 70:30, 80:20, and 90:10. The graph shows an improvement in storage modulus with increasing $Al_2(SO_4)_3$ content.

Example 7

Figure 7:
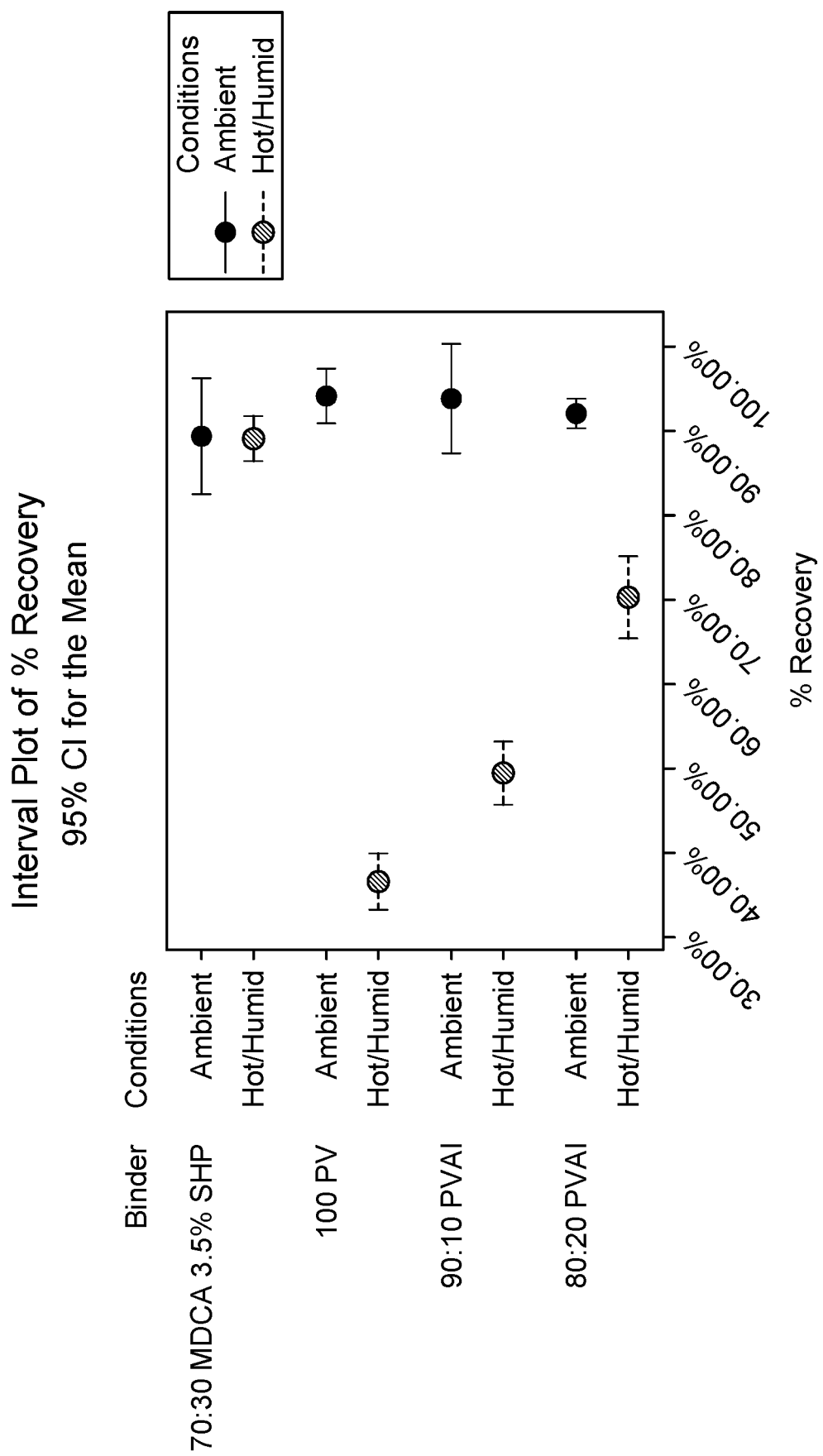
FIG. 7 is a graph showing the percent recovery for several binder compositions of polyvinyl alcohol and aluminum nitrate.

FIG. 7 shows the percent recovery of two binder compositions comprising PV and $Al(NO_3)_3$ (PVAl) in weight ratios of 90:10 and 80:20, respectively, compared to polyvinyl alcohol alone (labeled 100 PV) and a control MDCA binder. The percent recovery was determined at ambient conditions and under hot/humid conditions. Hot/humid conditions include placing the samples in a humidity chamber at 90° F. and 90% humidity for 7 days. Percent recovery for the PV-containing binders was similar to or better than the control binder under ambient conditions. Increasing aluminum salt content improved hot/humid performance.

Example 8

Figure 8:
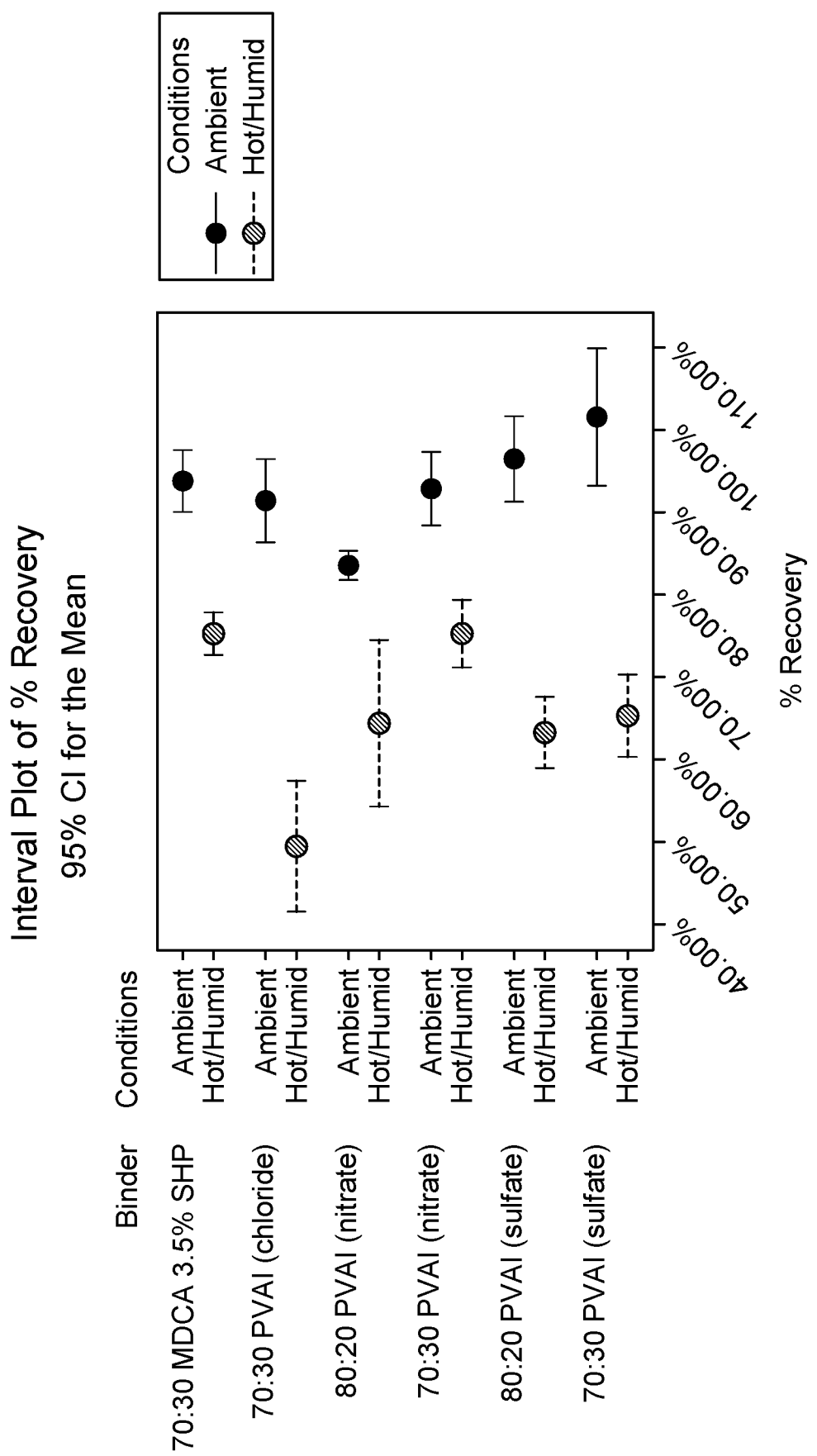
FIG. 8 is a graph showing the percent recovery for several binder compositions.

FIG. 8 shows the percent recovery of binder compositions comprising PV in combination with several aluminum salts compared to a control MDCA binder, under both ambient and hot/humid conditions. The aluminum salts are aluminum chloride (70:30 PV:Al weight ratios), aluminum nitrate (80:20 and 70:30 PV:Al weight ratios), and aluminum sulfate (80:20 and 70:30 weight ratio). The percent recovery was determined at ambient conditions and under hot/humid conditions. Hot/humid conditions include placing the samples in a humidity chamber at 90° F. and 90% humidity for 7 days. From the data set forth in FIG. 8, it was concluded that these binder formulations achieved good performance for percent recovery.

Example 9

Corrosion of the machinery that is used to form, for example, a fibrous insulation product is an important factor to consider when comparing binder systems. The pH of a binder system is indicative of its potential to corrode metal machinery. In addition, the pH of a binder system may change during heating (curing) as the components (for example acid in the binder) may be consumed during the curing process, thus leading to a less acidic final composition. Table 1 shows the measured pH of several binder systems in triplicate. The initial pH is the pH of the binder solution prior to spraying in the application process. The final pH is the pH of the solution resulting from soaking the pilot material after cure in water. The less acidic cure for the inventive binder systems is indicative of less potential for machine corrosion.

TABLE 1

| Binder | Specimen | pH | Average pH |
| --- | --- | --- | --- |
| Polyvinyl alcohol | 1 | 9.73 | |
| (initial pH 5.76) | 2 | 9.75 | |
| | 3 | 9.63 | 9.70 |
| 90:10 $PVAl(NO_3)_3$ | 1 | 8.02 | |
| (initial pH 3.45) | 2 | 8.06 | |
| | 3 | 8.04 | 8.04 |
| 80:20 $PVAl(NO_3)_3$ | 1 | 8.02 | |
| (initial pH 3.36) | 2 | 8.05 | |
| | 3 | 8.05 | 8.04 |

Example 10

Figure 9:
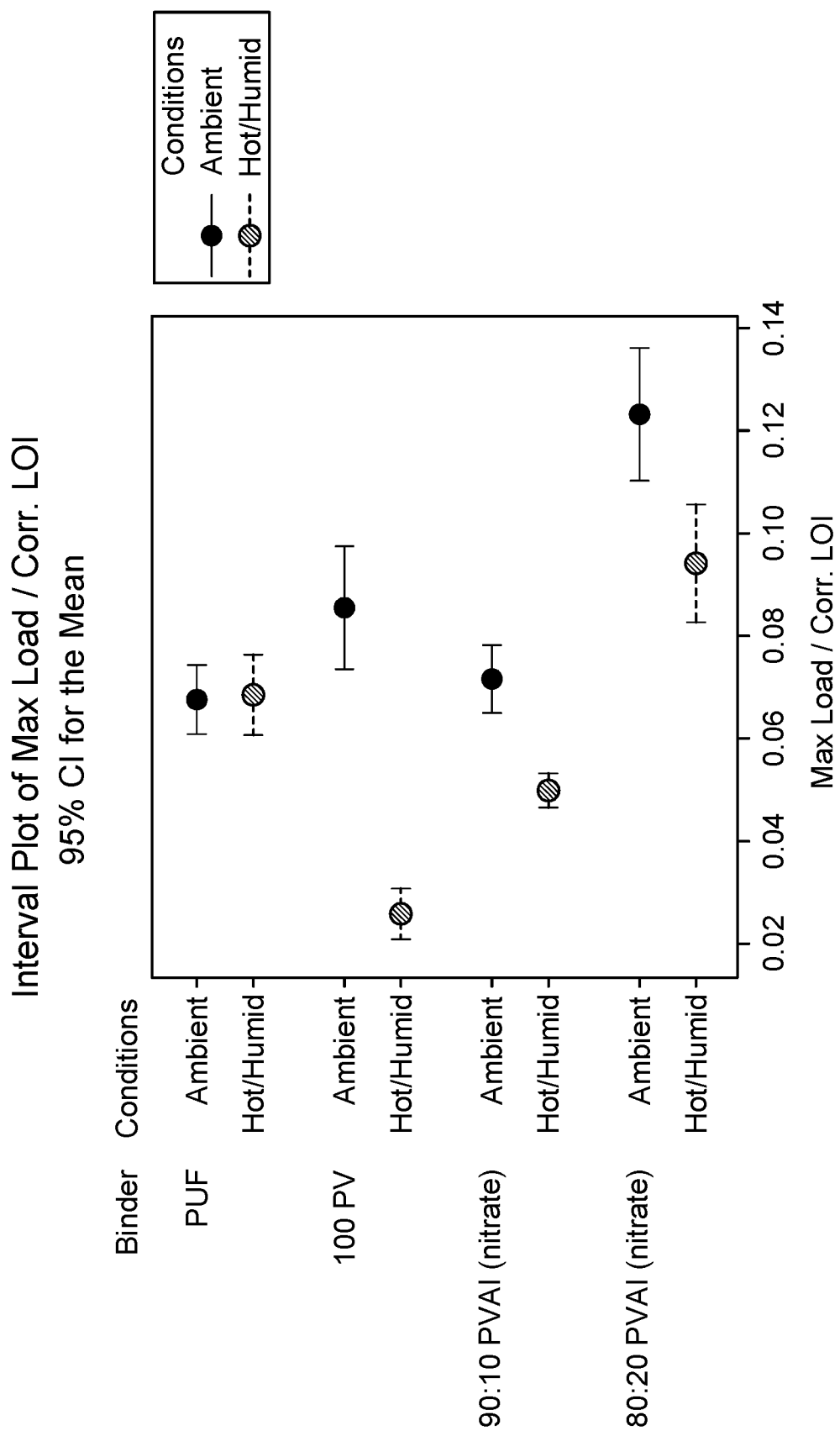
FIG. 9 is a graph showing the maximum load (corrected for LOI) for lab boards made with inventive binder compositions comprising polyvinyl alcohol/aluminum nitrate.

FIG. 9 is a graph showing the maximum measured loading capacity, adjusted for corrected LOI, for two inventive binder systems. The max load was determined at ambient conditions and under hot/humid conditions (as described for Example 1). The inventive binder systems include $PVAl(NO_3)_3$ in weight ratios of 90:10 and 80:20, respectively. The inventive binder compositions are compared to a control phenolic resin (labeled PUF) and polyvinyl alcohol alone. All binder systems are normalized for total solids. The 80:20 weight ratio of $PVAl(NO_3)_3$ performed as good or better than the control binder systems.

Example 11

Figure 10:
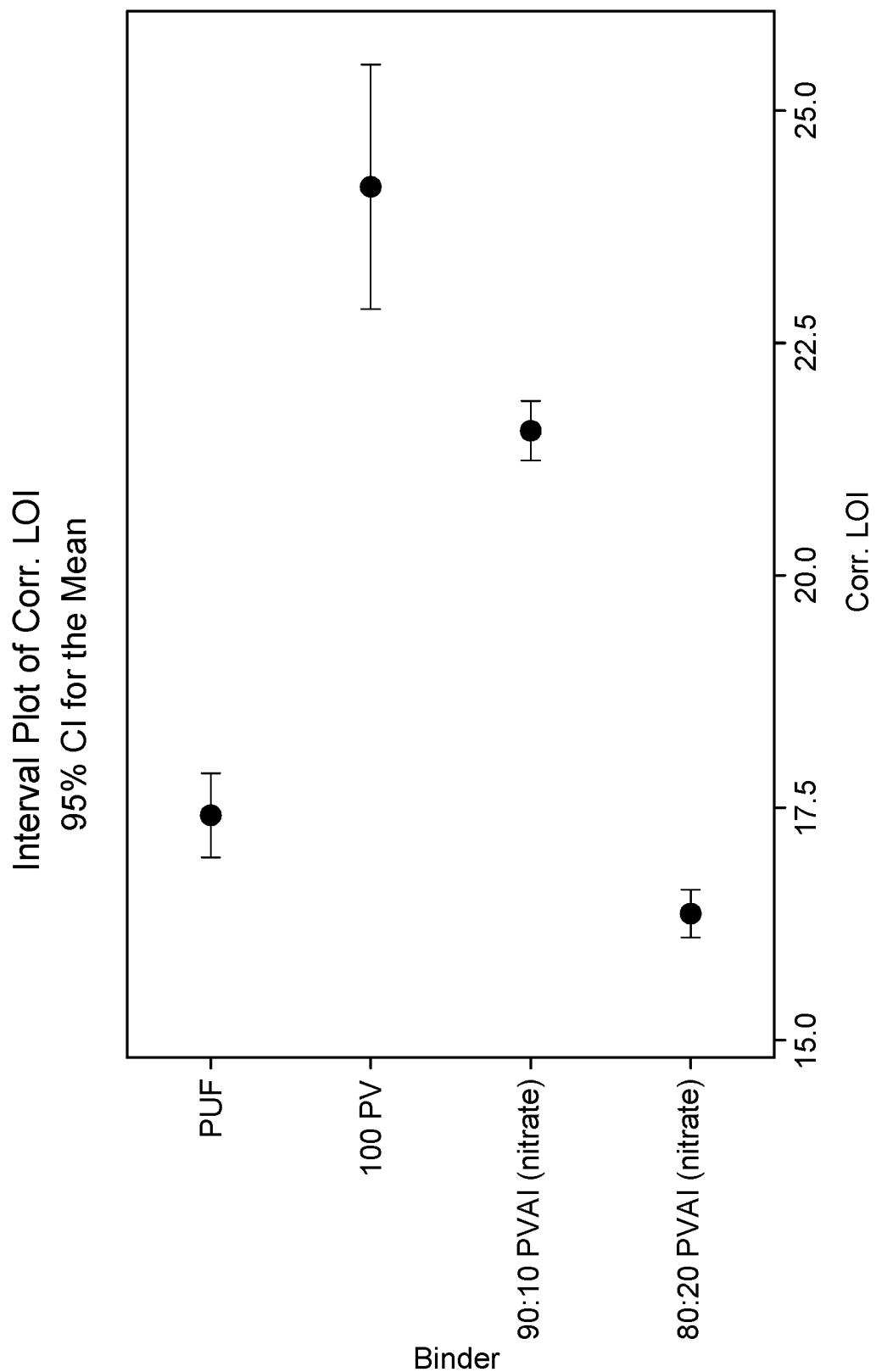
FIG. 10 is a graph showing the corrected LOI for inventive binder compositions comprising polyvinyl alcohol/aluminum nitrate.

FIG. 10 is a graph showing the corrected LOI for the binder systems that were utilized in Example 10.

Example 12

Figure 11:
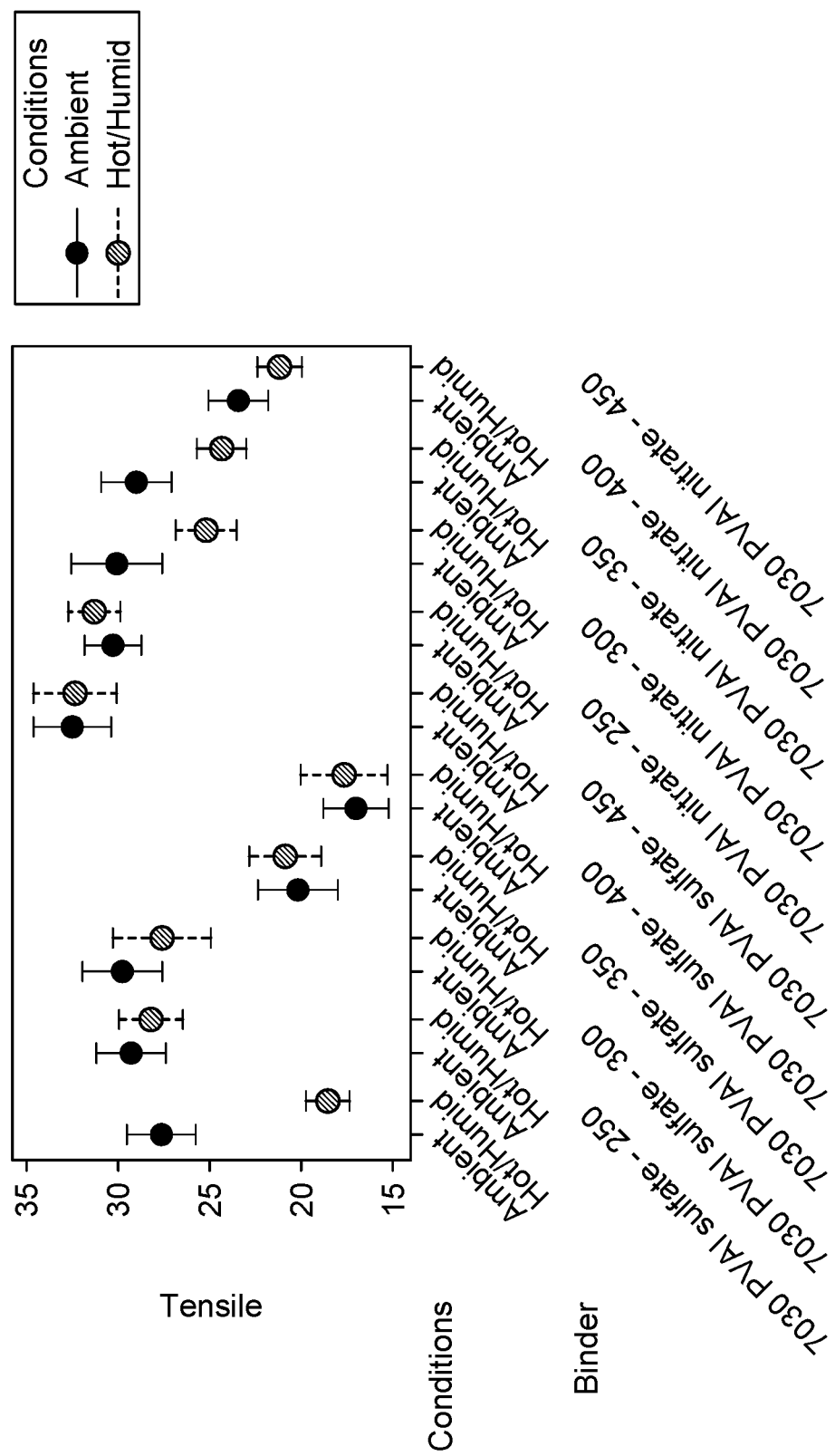
FIG. 11 is a graph showing the tensile strength of a series of handsheets made using inventive binder compositions which were cured at temperatures between 250° F. and 450° F.

Handsheets were formed using a 70:30 weight ratio of two PV aluminum salt binders. The handsheets were formed with binders including $Al(NO_3)_3$ or $Al_2(SO_4)_3$ and were cured at temperatures of 250° F., 300° F., 350° F., 400° F., and 450° F. FIG. 11 shows the tensile strength measurements of the handsheets under both ambient and hot/humid conditions (as described for Example 1).

Example 13

Figure 12:
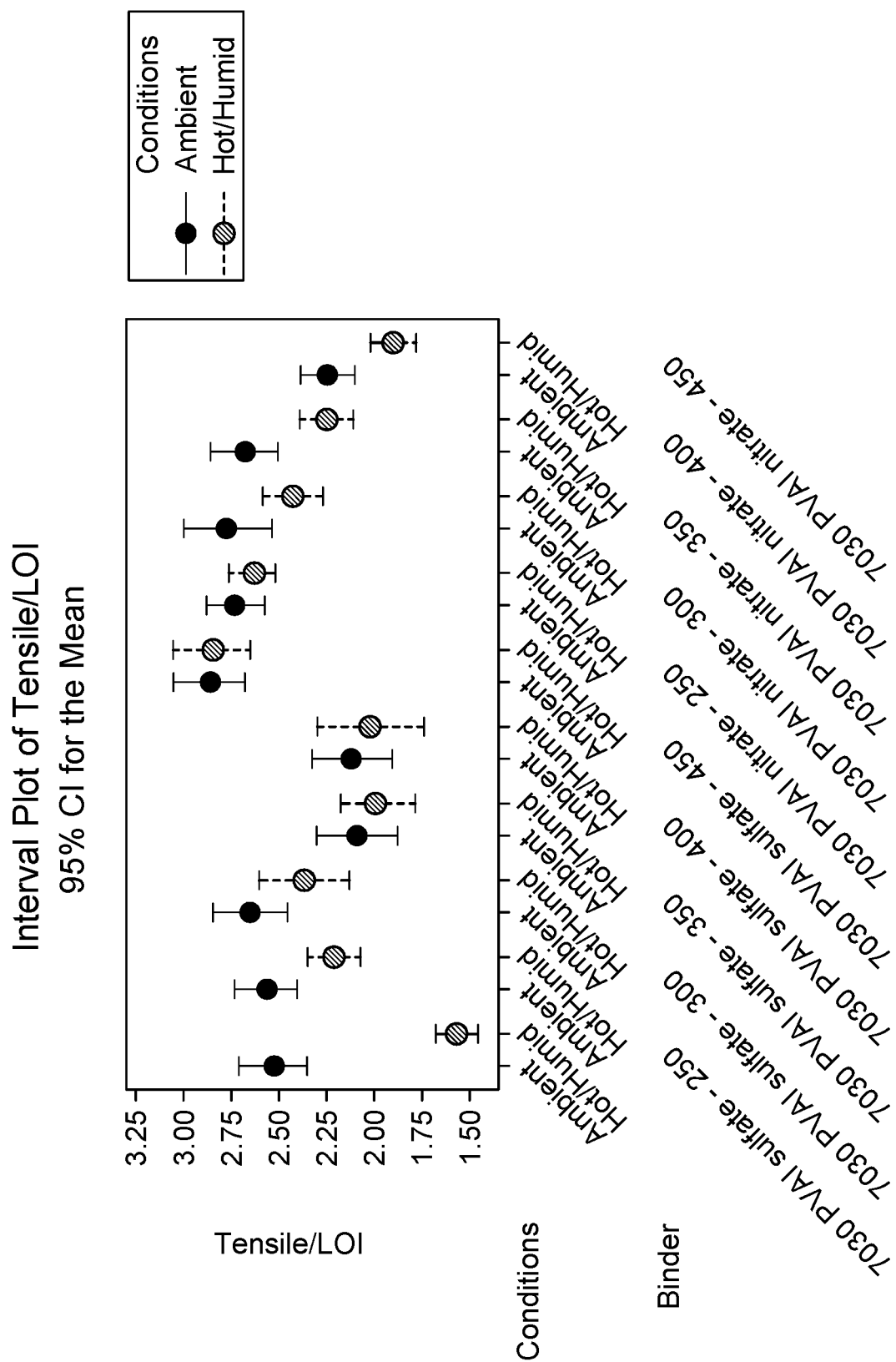
FIG. 12 is a graph showing the tensile strength normalized for LOI of a series of handsheets made using inventive binder compositions which were cured at temperatures between 250° F. and 450° F.

FIG. 12 shows the measured tensile strength for the handsheets described in Example 12, with the tensile strength corrected for measured LOI.

Example 14

Figure 13:
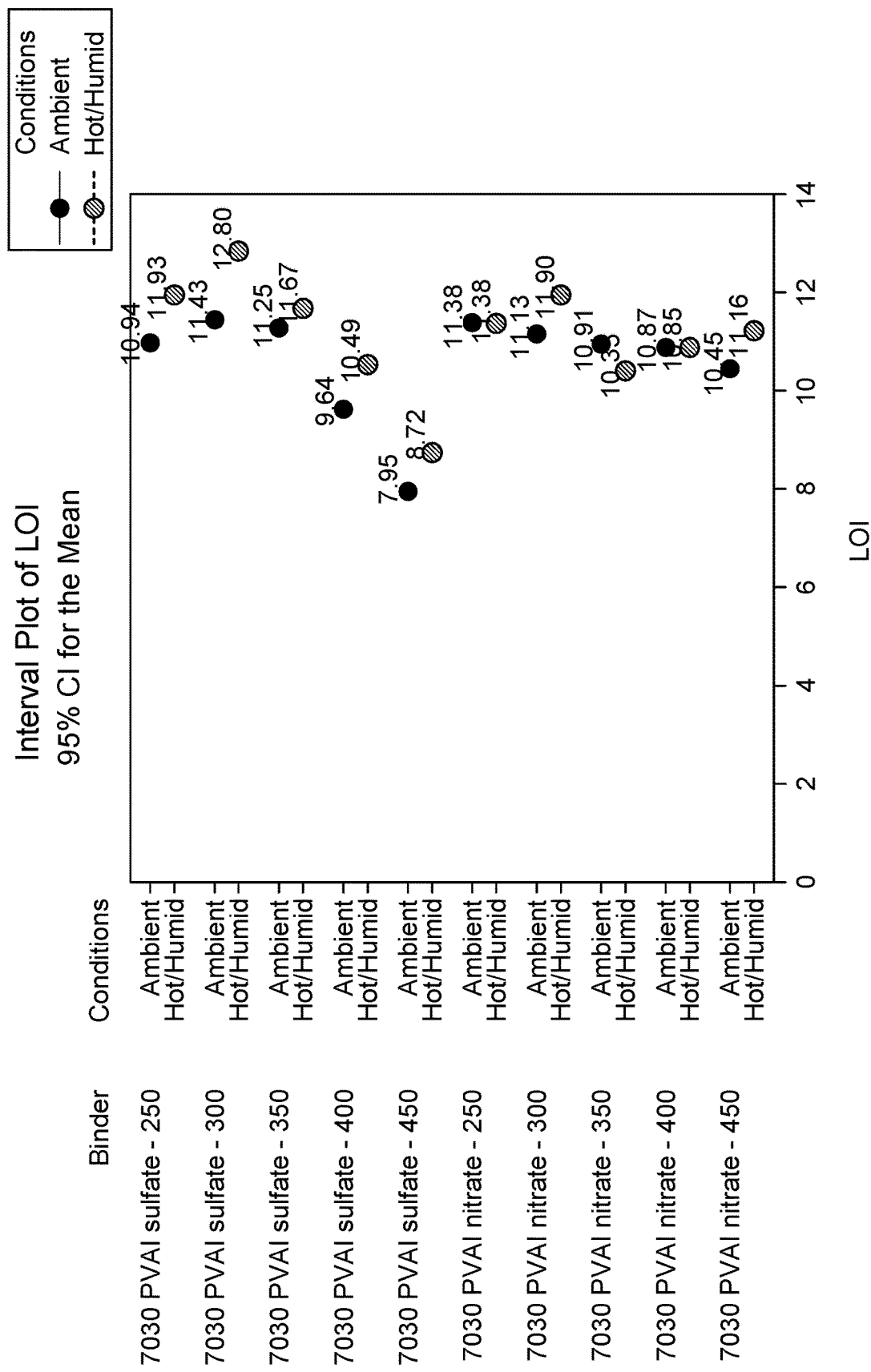
FIG. 13 is a graph showing the LOI for handsheets made using inventive binder compositions which were cured at temperatures between 250° F. and 450° F.

FIG. 13 is a graph showing the measured LOI for the handsheets described in Example 12. From the data set forth in FIG. 12, FIG. 13, and FIG. 14, it was concluded that these binder formulations achieved good performance on handsheets at lower temperatures typically used in exemplary manufacturing processes.

Example 15

Figure 14:
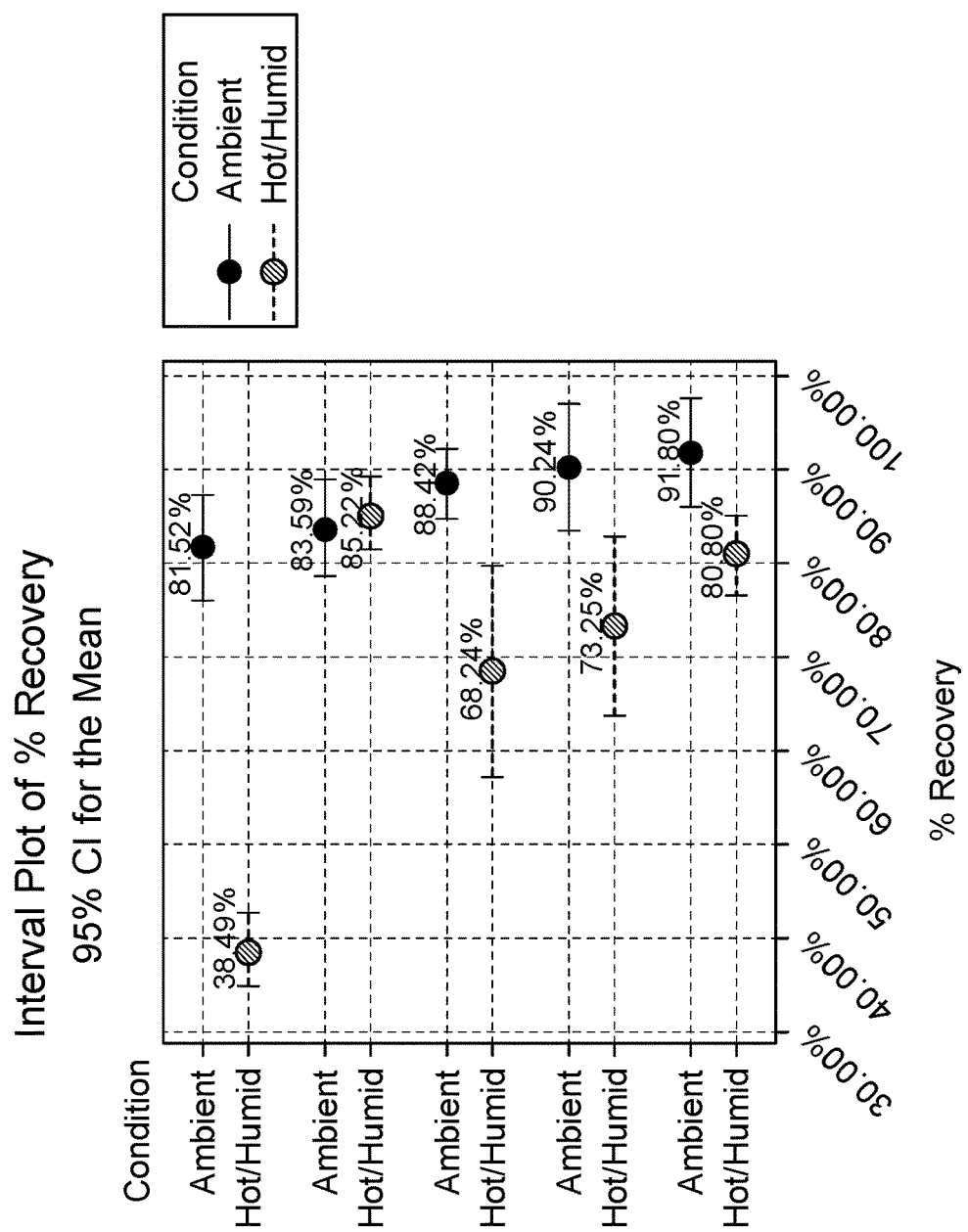
FIG. 14 is a graph showing the percent recovery for samples made using inventive binder compositions which were cured at temperatures between 300° F. and 400° F.

FIG. 14 is a graph showing the percent recovery for two binder systems at different cure temperatures. A binder composition comprising $PVAl(NO_3)_3$ in a weight ratio of 70:30 was cured at temperatures of 300° F., 350° F., and 400° F. The inventive binders were compared to a control MDCA binder cured at 300° F. and 400° F. The percent recovery was measured under both ambient and hot/humid conditions. Hot/humid conditions include placing the samples in a humidity chamber at 90° F. and 90% humidity for 3 days.

Example 16

Figure 15:
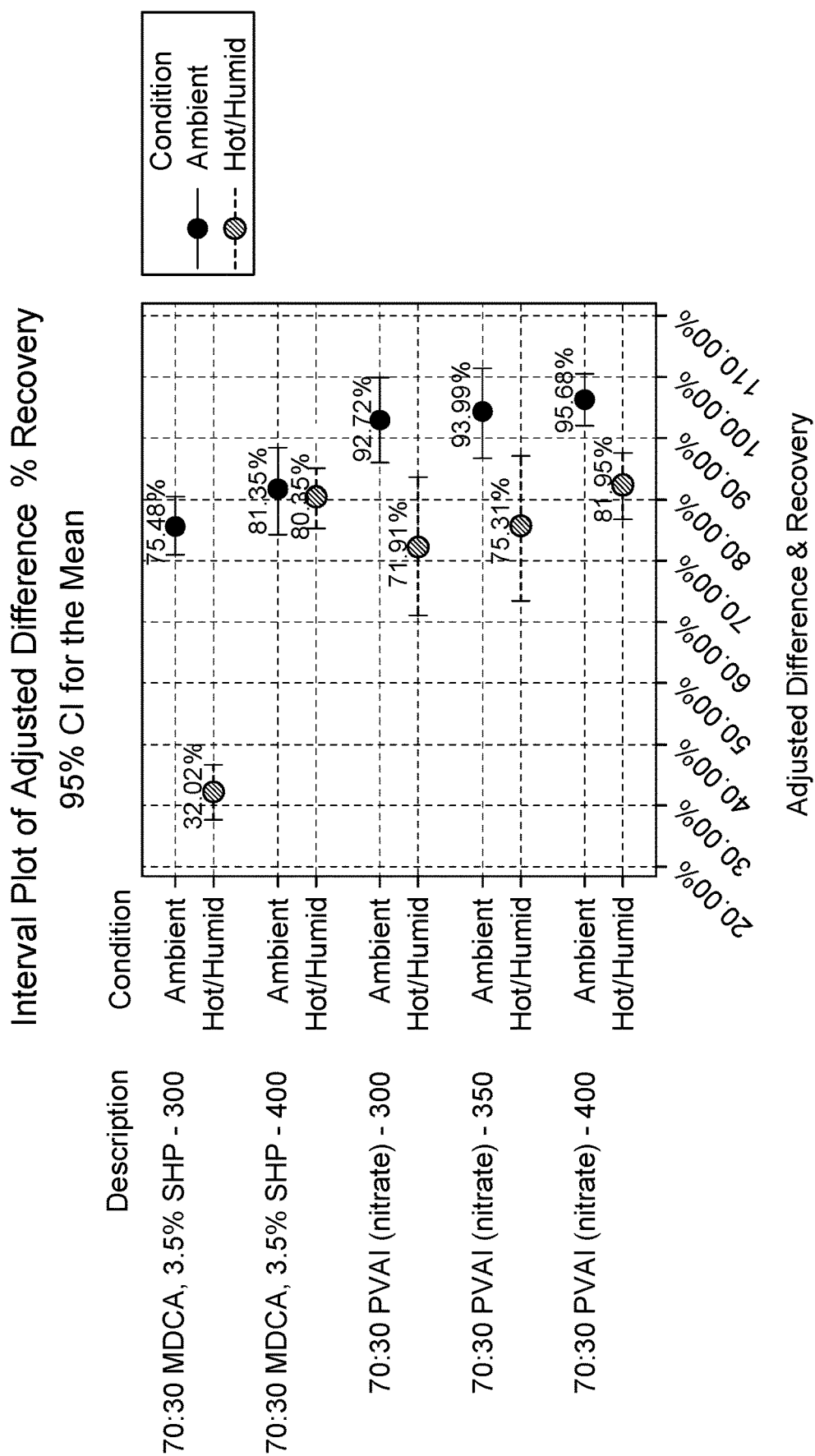
FIG. 15 is a graph showing the percent recovery normalized for area weight for samples made using inventive binder compositions which were cured at temperatures between 300° F. and 400° F.

FIG. 15 shows the percent recovery for the binders tested in Example 14 with the percent recovery normalized by area weight.

Example 17

Figure 16:
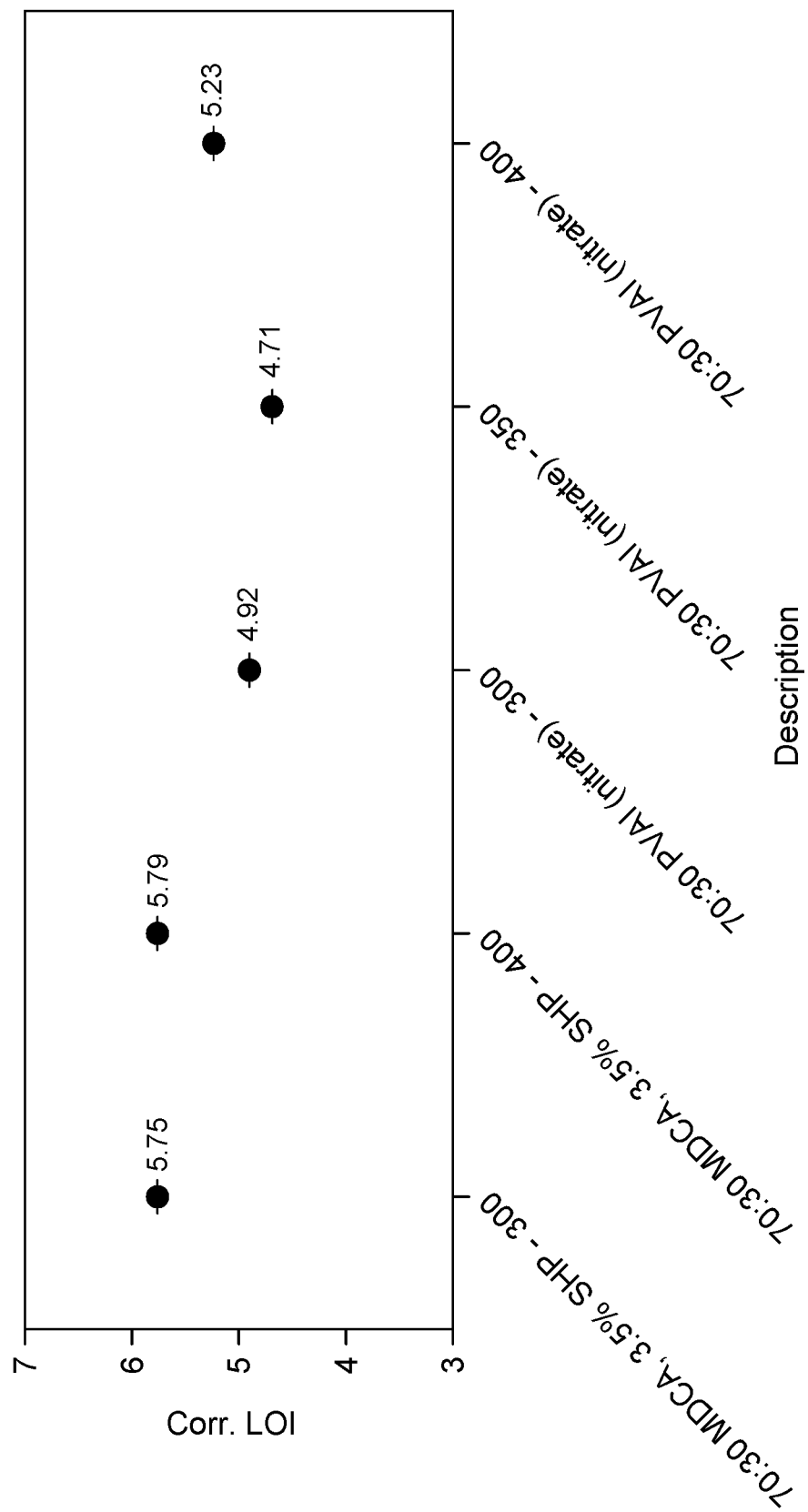
FIG. 16 is a graph showing corrected LOI for samples made using inventive binder compositions which were cured at temperatures between 300° F. and 400° F.

FIG. 16 shows the corrected LOI for the binders tested in Example 14. From the data set forth in FIG. 14, FIG. 15, and FIG. 16, it was concluded that these binder formulations achieved good performance in percent recovery even when correcting for LOI at both low (300° F.) and high (400° F.) curing temperatures while MDCA only held performance at high curing temperature.

Example 18

Figure 17:
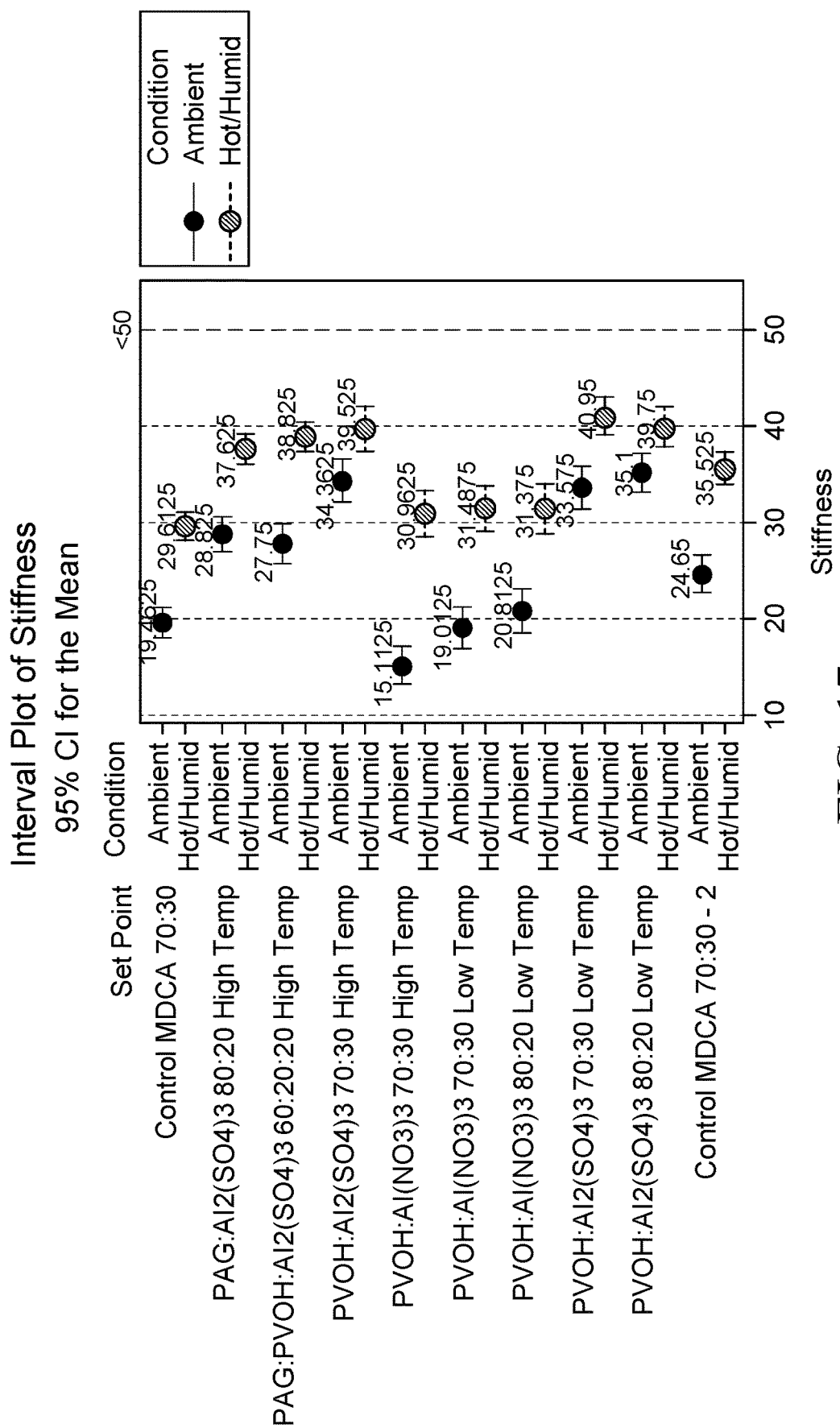
FIG. 17 is a graph showing the measured stiffness of a series of sample batts made using inventive binder compositions which were cured at either high temperature (415-425° F. as measured in the batt) or low temperature (350-360° F. as measured in the batt) with a target LOI of 4.65%.

R-15 insulative batts were manufactured using several binder compositions in a manner known by those of skill in the art. FIG. 17 is a graph showing the measured stiffness (angular deflection) of the insulative batts under both ambient and hot/humid conditions. Hot/humid conditions include placing the samples in an autoclave at 90° F. and 90% humidity for 3 days. The binder compositions were cured at either high temperature (415-425° F. as measured in the batt) or low temperature (350-360° F. as measured in the batt) with a target LOI of 4.65%. The inventive binder compositions were compared to a control MDCA binder, a mixture of PAG (polyacrylate/glycerol) and $PVAl_2(SO_4)_3$, and a mixture of PAG (polyacrylate/glycerol) and $PVAl_2(SO_4)_3$.

Example 19

Figure 18:
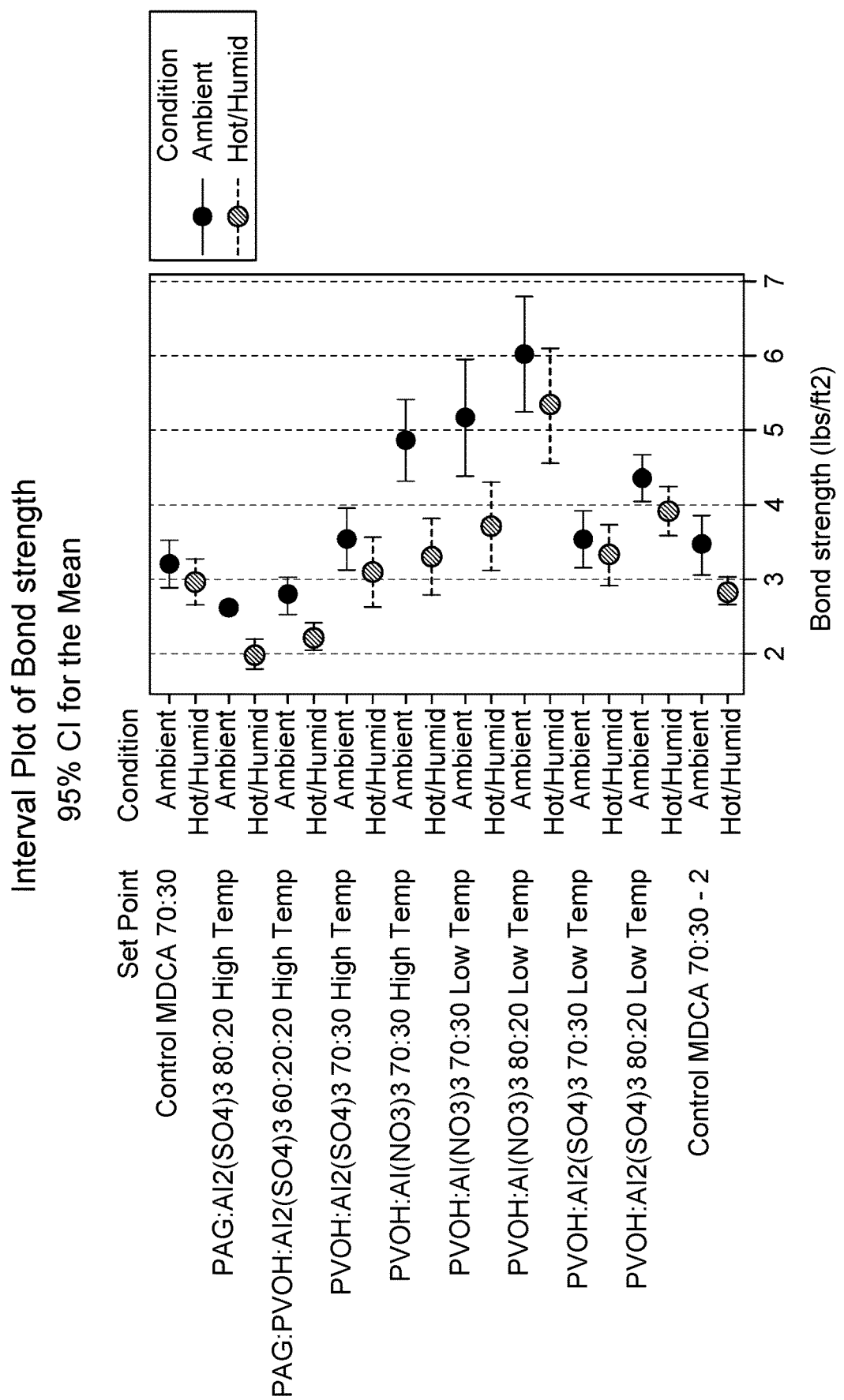
FIG. 18 is a graph showing the bond strength of samples made using inventive binder compositions which were cured at either high temperature (415-425° F. as measured in the batt) or low temperature (350-360° F. as measured in the batt) with a target LOI of 4.65%.

Bond strength of the insulative batts made with the binder compositions described in Example 18 was measured. The results are shown in FIG. 18. The bond strength was measured under both ambient and hot/humid conditions. Hot/humid conditions include placing the samples in an autoclave at 90° F. and 90% humidity for 3 days.

Example 20

Figure 19:
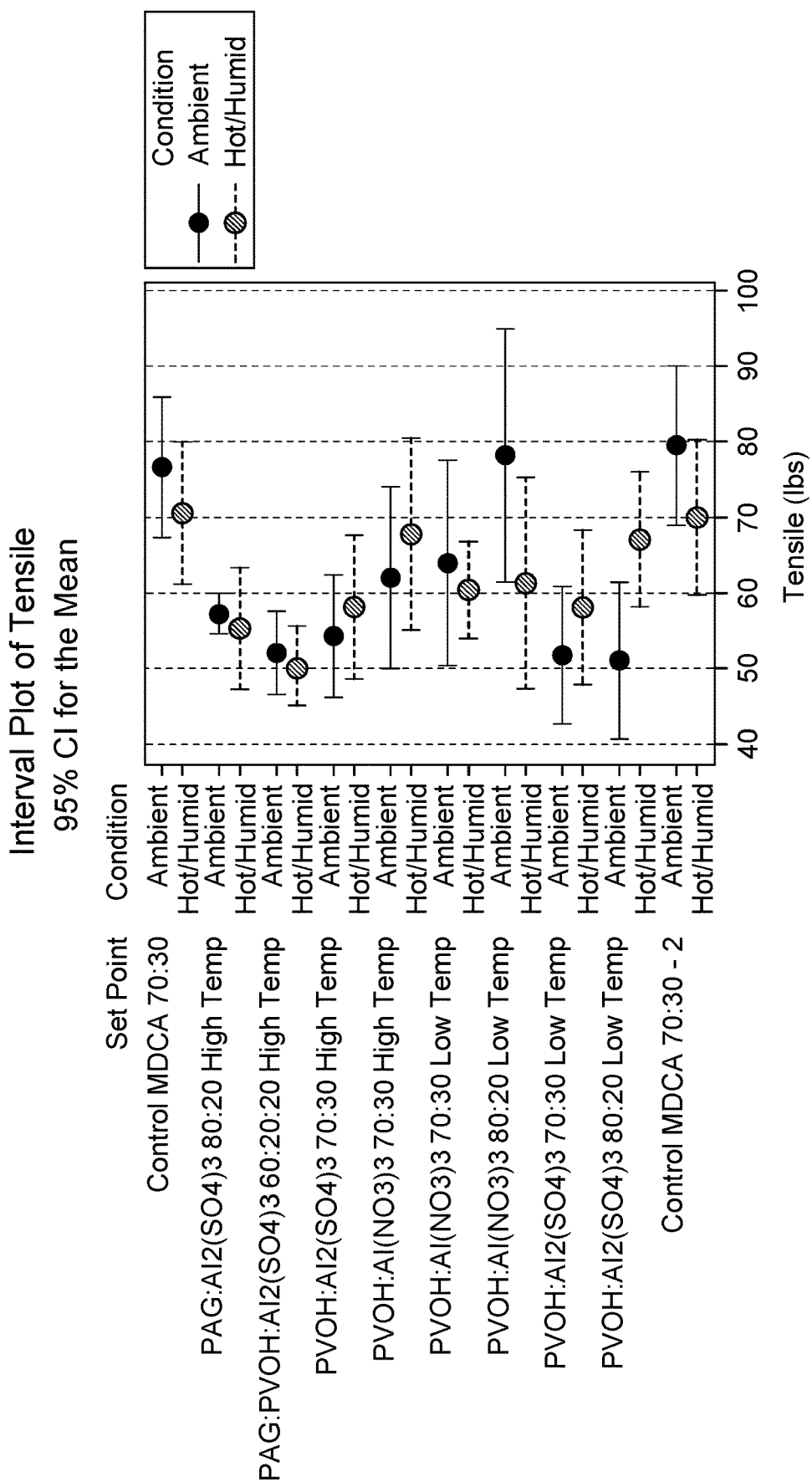
FIG. 19 is a graph showing the tensile strength of samples made using inventive binder compositions which were cured at either high temperature (415-425° F. as measured in the batt) or low temperature (350-360° F. as measured in the batt) with a target LOI of 4.65%.

FIG. 19 is a graph showing the measured tensile strength of insulative batts made with the binder compositions described in Example 18. The tensile strength was measured under both ambient and hot/humid conditions. Hot/humid conditions include placing the samples in an autoclave at 90° F. and 90% humidity for 3 days.

Example 21

The average percent loss on ignition was measured and corrected for weight of the aluminum salt for the insulative batts described in Example 18. The results are shown in Table 2. Target LOI was 4.65%.

TABLE 2

| Binder Composition | Average % LOI (LOI is corrected LOI for binders that include a metal salt) |
|---|---|
| MDCA 70:30 (Control #1) | 4.71 |
| $PAG:Al_2(SO_4)_3$ 80:20 High temp. | 3.62 |
| $PAG:PVOH:Al_2(SO_4)_3$ 60:20:20 High temp. | 3.59 |
| $PVOH:Al_2(SO_4)_3$ 70:30 High temp. | 4.03 |
| $PVOH:Al(NO_3)_3$ 70:30 High temp. | 4.21 |
| $PVOH:Al(NO_3)_3$ 70:30 Low temp. | 4.26 |
| $PVOH:Al(NO_3)_3$ 80:20 Low temp. | 4.51 |
| $PVOH:Al_2(SO_4)_3$ 70:30 Low temp. | 4.07 |
| $PVOH:Al_2(SO_4)_3$ 80:20 Low temp. | 4.27 |
| MDCA 70:30 (Control #2) | 4.40 |

Example 22

The amount of moisture that a fibrous insulation product absorbs is an important measure in determining loss of insulative capacity over time. Moisture sorption was measured for the insulative batts described in Example 18. Measured moisture sorption for the samples are shown in Table 3. All samples were below the target value of 5% moisture sorption.

TABLE 3

| Binder Composition | Moisture Sorption % |
|---|---|
| MDCA 70:30 (Control #1) | 2.90 |
| $PAG:Al_2(SO_4)_3$ 80:20 High temp. | 2.12 |
| $PAG:PVOH:Al_2(SO_4)_3$ 60:20:20 High temp. | 1.68 |
| $PVOH:Al_2(SO_4)_3$ 70:30 High temp. | 1.33 |
| $PVOH:Al(NO_3)_3$ 70:30 High temp. | 1.83 |
| $PVOH:Al(NO_3)_3$ 70:30 Low temp. | 2.21 |
| $PVOH:Al(NO_3)_3$ 80:20 Low temp. | 2.07 |
| $PVOH:Al_2(SO_4)_3$ 70:30 Low temp. | 1.49 |
| $PVOH:Al_2(SO_4)_3$ 80:20 Low temp. | 1.59 |
| MDCA 70:30 (Control #2) | 1.83 |

Example 23

Corrosion testing was performed on the insulative batt samples described in Example 18 via an ASTM C665 method. In accordance with this standard, the three $PVOH:Al(NO_3)_3$ binder compositions demonstrated acceptable corrosion performance. From the data presented in Examples 18-23, it was concluded that the inventive binder compositions could be cured under typical manufacturing conditions and achieve good product performance as binders for fibrous insulation products.

Example 24

Figure 20:
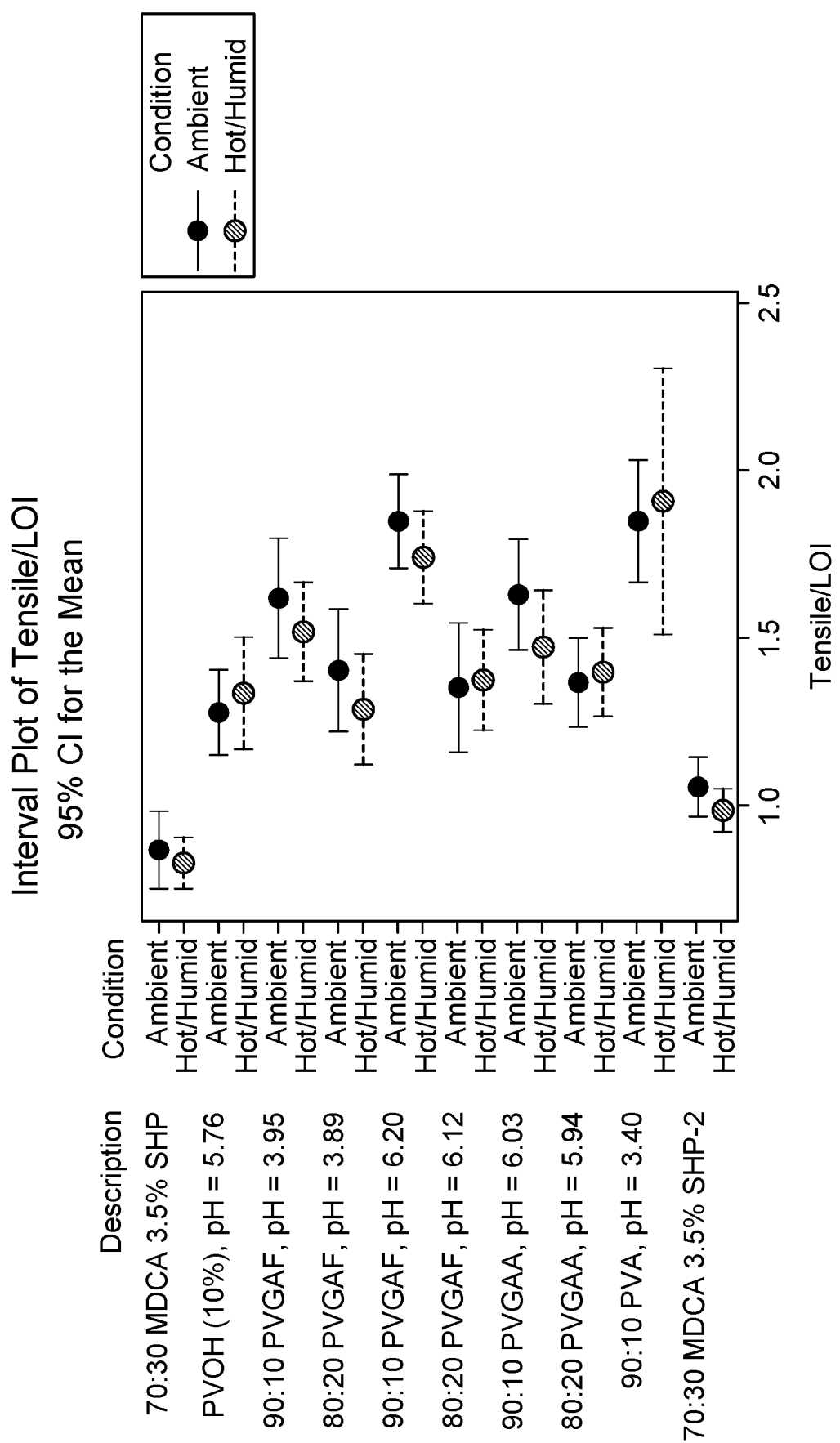
FIG. 20 is a graph showing the measured tensile strength of handsheets made using a variety of binder compositions. The inventive binder composition comprising PV and aluminum chloride (labeled PVA) in a weight ratio of 90:10 was compared to a control MDCA binder composition. Other binder compositions are PVGAF=polyvinyl alcohol, gallic acid, and iron nitrate; and PVGAA=polyvinyl alcohol, gallic acid, and aluminum chloride.

Handsheets were made using a variety of binder compositions. The inventive binder composition comprising PV and aluminum chloride (labeled PVA) in a weight ratio of 90:10 was compared to a control MDCA binder composition. The nonwoven fiberglass handsheets were dried and cured for three minutes at 475° F. The tensile strength for each sample were determined under ambient and hot/humid conditions and the results are shown in FIG. 20. Hot/humid conditions include placing the samples in an autoclave at 90° F. and 90% humidity for 30 minutes.

Example 25

Figure 21:
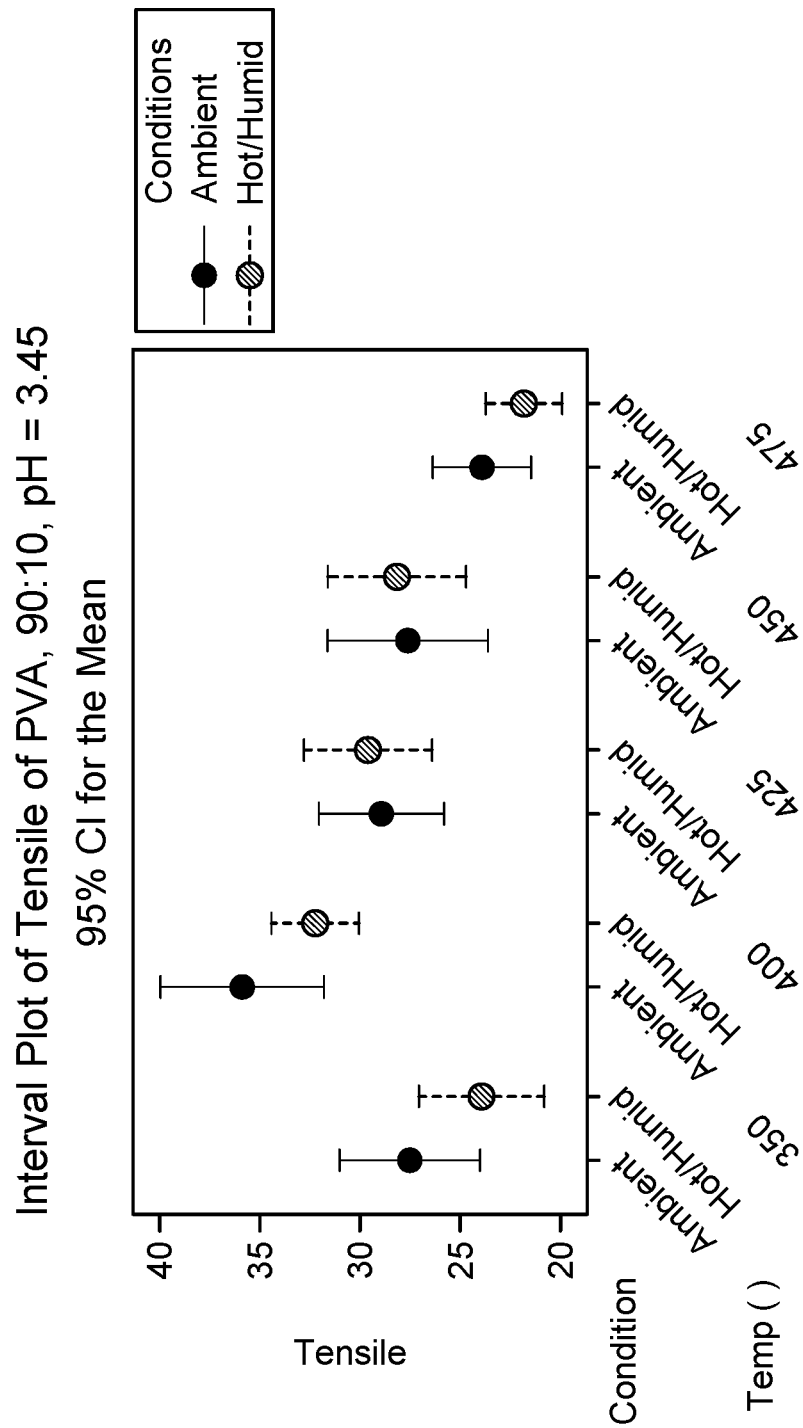
FIG. 21 is a graph showing the tensile strength of handsheets made using a binder composition comprising PV and aluminum chloride (labeled PVA) in a weight ratio of 90:10.

Handsheets using a binder composition comprising PV and aluminum chloride (labeled PVA) in a weight ratio of 90:10 were made and cured at a variety of temperatures. The tensile strength for each sample was determined under ambient and hot/humid conditions. Hot/humid conditions include placing the samples in an autoclave at 90° F. and 90% humidity for 30 minutes. The results are provided in FIG. 21.

Example 26

Figure 22:
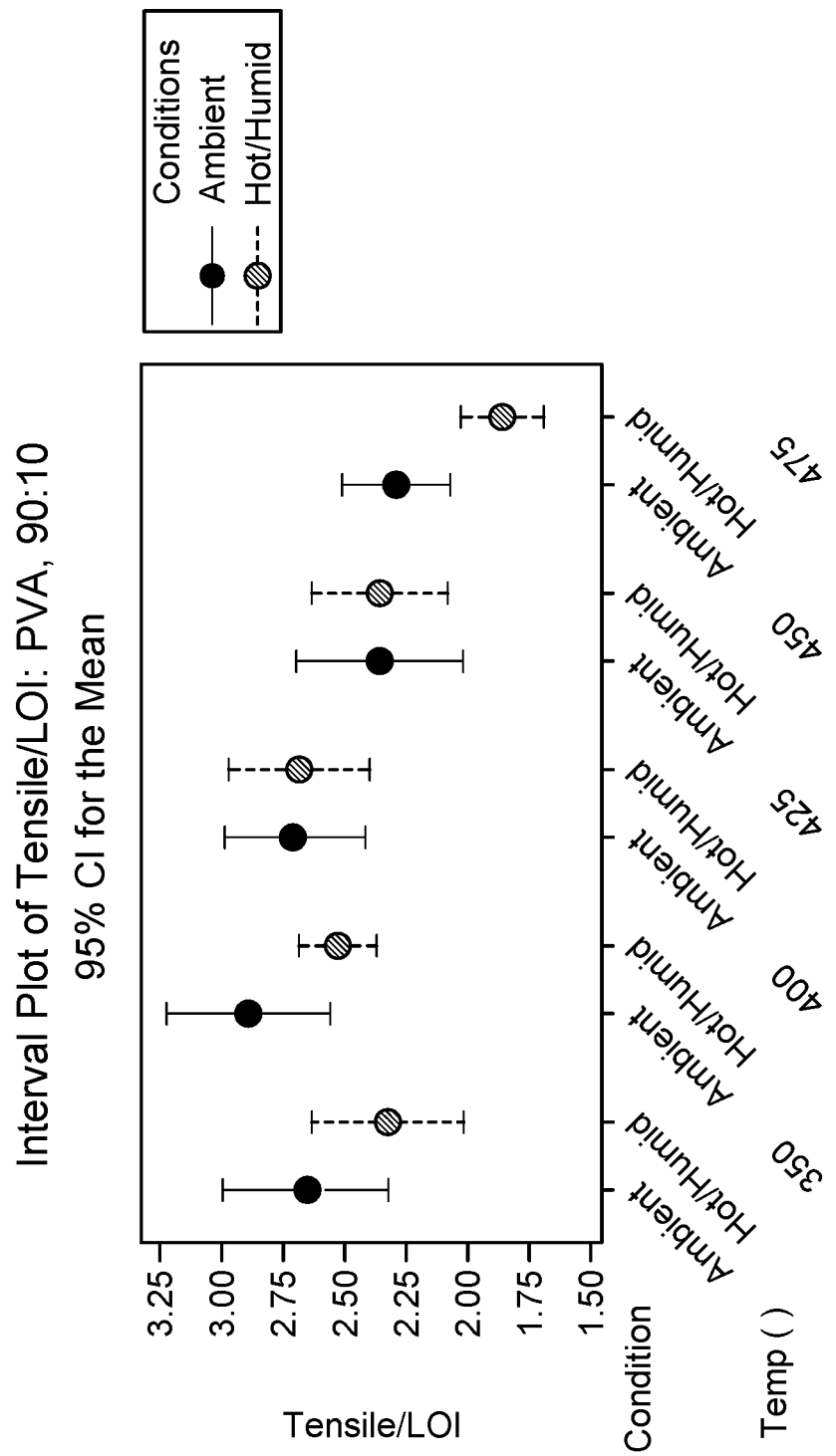
FIG. 22 is a graph showing the results from Example 25 adjusted to correct for LOI.

The results from Example 25 were adjusted to correct for LOI. The results for the measured tensile strength/LOI are shown in FIG. 22.

Example 27

Figure 23:
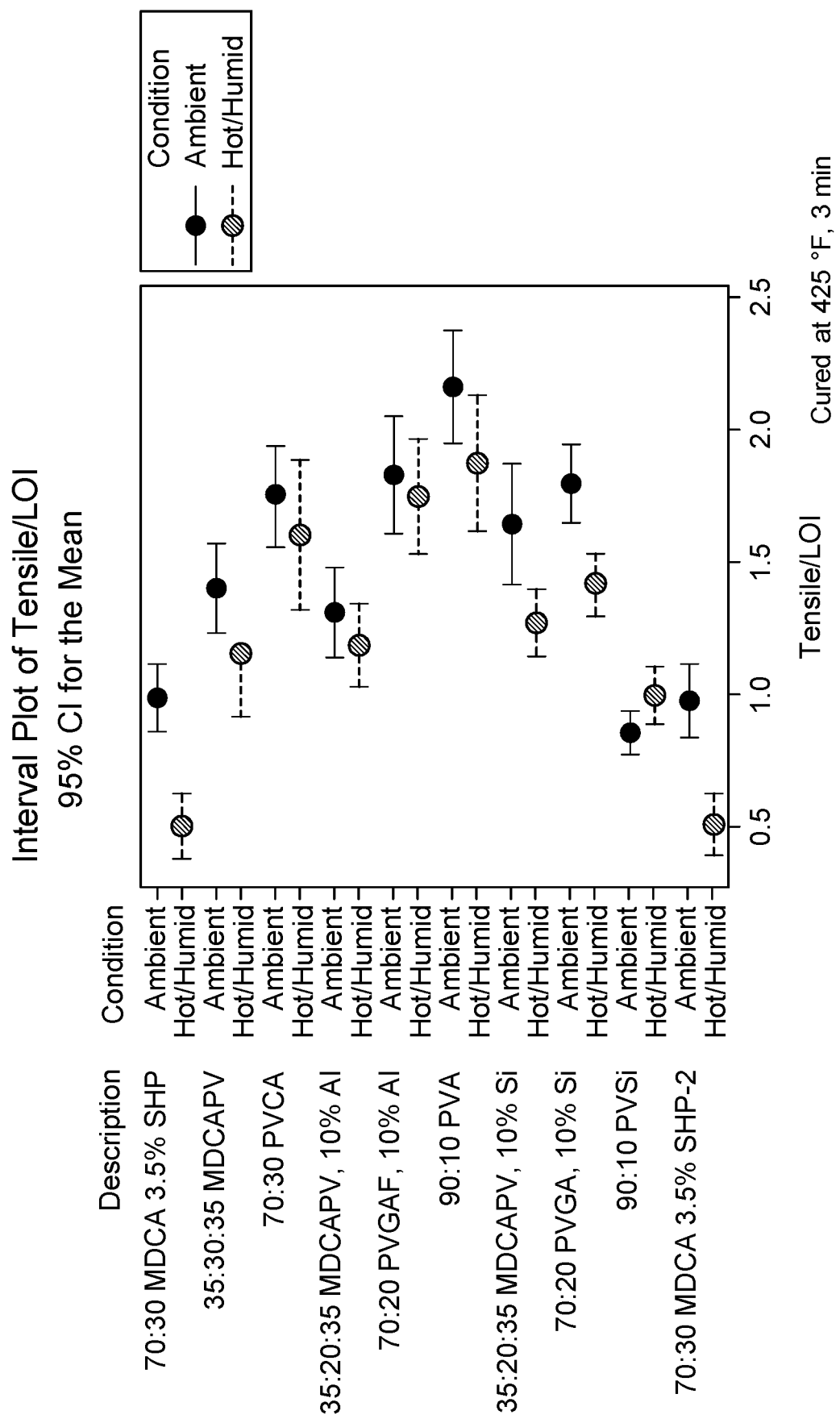
FIG. 23 is a graph showing the measured tensile strength for handsheets made using a variety of binder compositions.

Handsheets were made using a variety of binder compositions. The inventive binder composition comprising PV and aluminum chloride (labeled PVA) in a weight ratio of 90:10 was compared to a control MDCA binder composition. Other formulations include MDCAPV=maltodextrin, citric acid and polyvinyl alcohol, PVCA=polyvinyl alcohol and citric acid, PVSi=polyvinyl alcohol and sodium silicate. The nonwoven fiberglass handsheets were dried and cured for three minutes at 425° F. The tensile strength for each sample was determined under ambient and hot/humid conditions. The tensile strength was then corrected for LOI. Hot/humid conditions include placing the samples in an autoclave at 90° F. and 90% humidity for 30 minutes. The results are shown in FIG. 23.

Example 28

Figure 24:
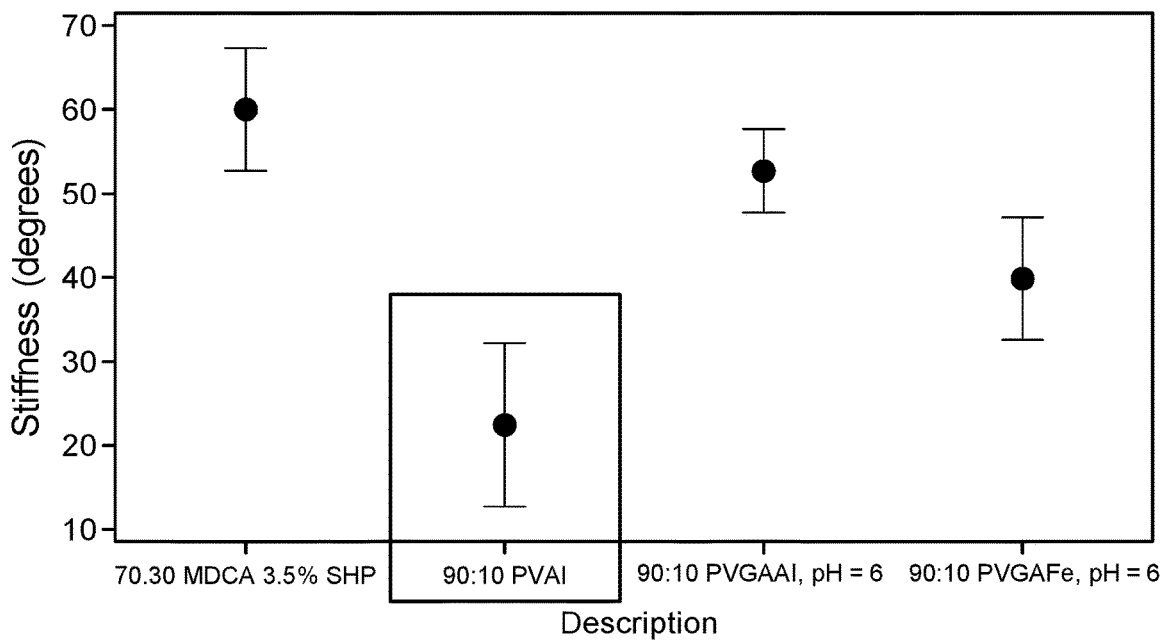
FIG. 24 is a graph showing the measured stiffness of an inventive binder composition compared to a control MDCA binder, and two additional binders including polyvinyl alcohol, namely, polyvinyl alcohol, gallic acid, aluminum chloride (labeled PVGAAl); and polyvinyl alcohol, gallic acid, iron nitrate (labeled PVGAFe).

FIG. 24 is a graph showing the measured stiffness of an inventive binder composition compared to a control MDCA binder and two additional binders including polyvinyl alcohol, namely polyvinyl alcohol, gallic acid, and aluminum chloride (labeled PVGAAl) and polyvinyl alcohol, gallic acid, iron nitrate (labeled PVGAFe)

Example 29

Figure 25:
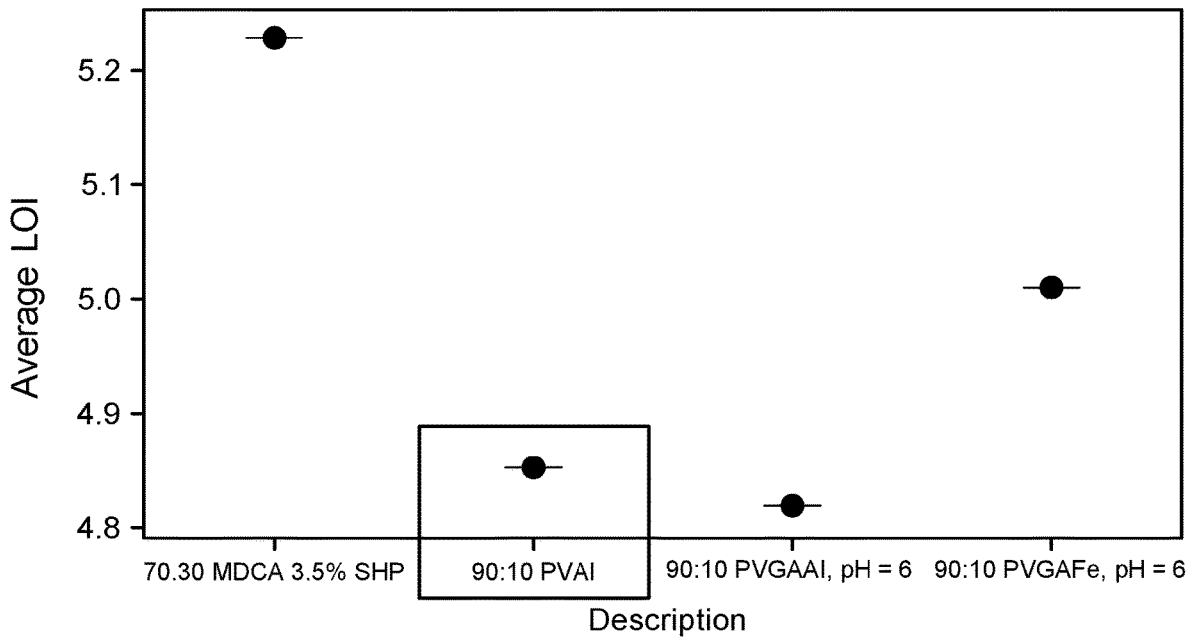
FIG. 25 is a graph showing the average LOI for the binder compositions tested in Example 28.

The average LOI for the binder compositions tested in Example 28 are shown in FIG. 25.

Example 30

Figure 26:
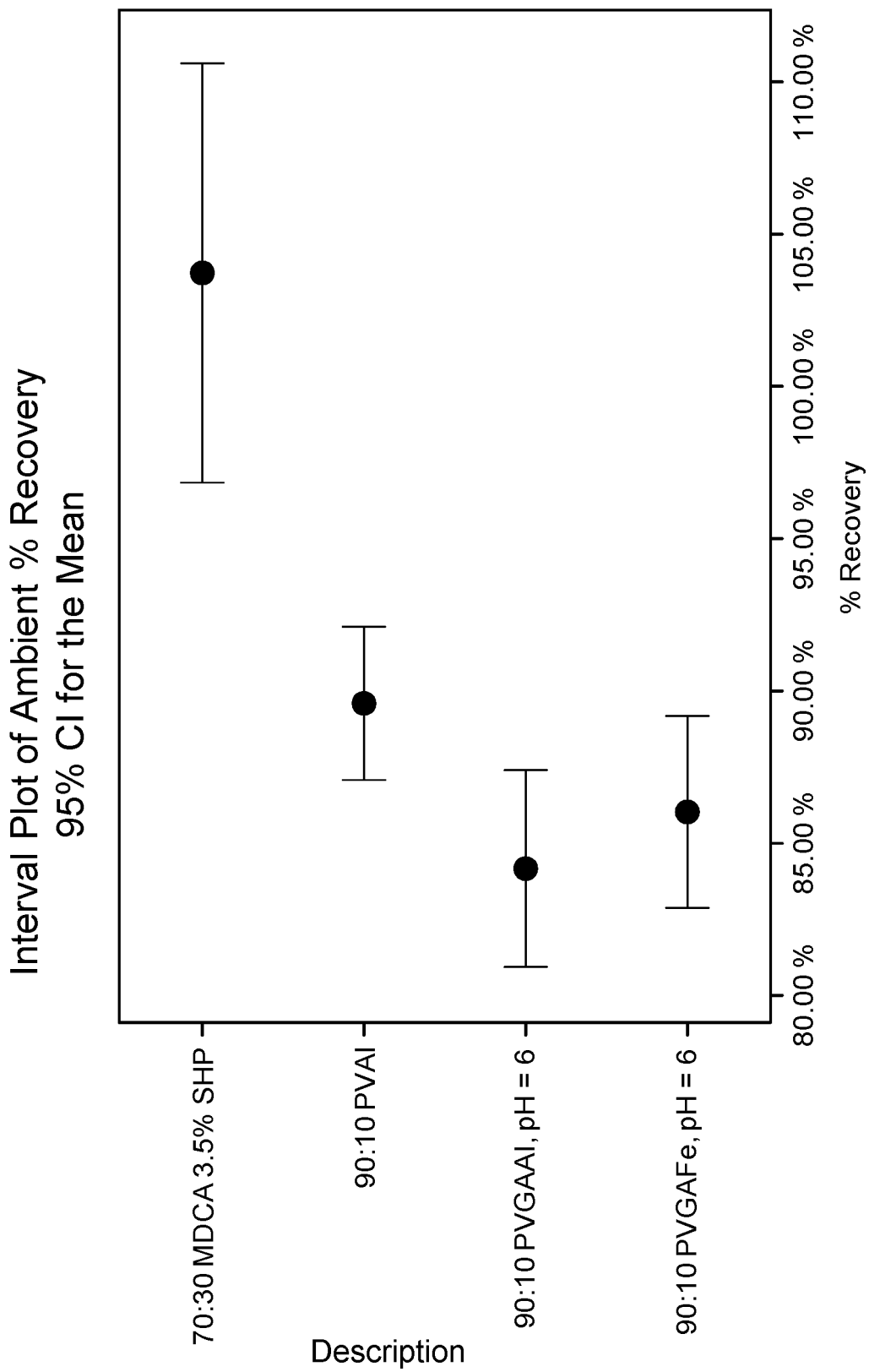
FIG. 26 is a graph showing the percent recovery for the binders compositions in Example 28. PVAl is polyvinyl alcohol and aluminum chloride polyvinyl alcohol, gallic acid, aluminum chloride (labeled PVGAAl); and polyvinyl alcohol, gallic acid, iron nitrate (labeled PVGAFe).

The percent recovery for the binders described in Example 28 are shown in FIG. 26.

Examples 31-38

A series of binder formulations were prepared for side-by-side testing of a variety of properties. The binders were applied to mineral wool to produce light density batts (i.e., 3 lbs/ft³ to 4 lbs/ft³). Table 4 shows the composition of the binders and the flow rate of the respective binders during application.

TABLE 4

| Binder | Description |
|---|---|
| SP1 | PUF Control 1 |
| SP2 | 70:30 PVOH:Al(NO$_3$)$_3$ (10.5 flow) |
| SP3 | 70:30 PVOH:Al(NO$_3$)$_3$ (9.5 flow) |
| SP4 | 70:30 PVOH:Al(NO$_3$)$_3$ (10.5 flow, inc fan) |
| SP5 | 70:30 PVOH:Al(NO$_3$)$_3$ (10.5 flow, inc fan, 50° F. temp in oven zones 1 and 2) |

TABLE 4-continued

| Binder | Description |
|---|---|
| SP6 | 70:30 PVOH:Al(NO$_3$)$_3$ + Additive A |
| SP6A | 70:30 PVOH:Al(NO$_3$)$_3$ + Additive B |
| SP7 | PUF Control 2 |

Flow refers to the rate of water injected during the set point (gallons/minute). Inc fan refers to an increase in the airflow rate through the insulation pack while curing. Additive A and Additive B are included in SP6 and SP6A, respectively, as processing aids to improve processing and flow of the binder formulation.

Example 31

Figure 27:
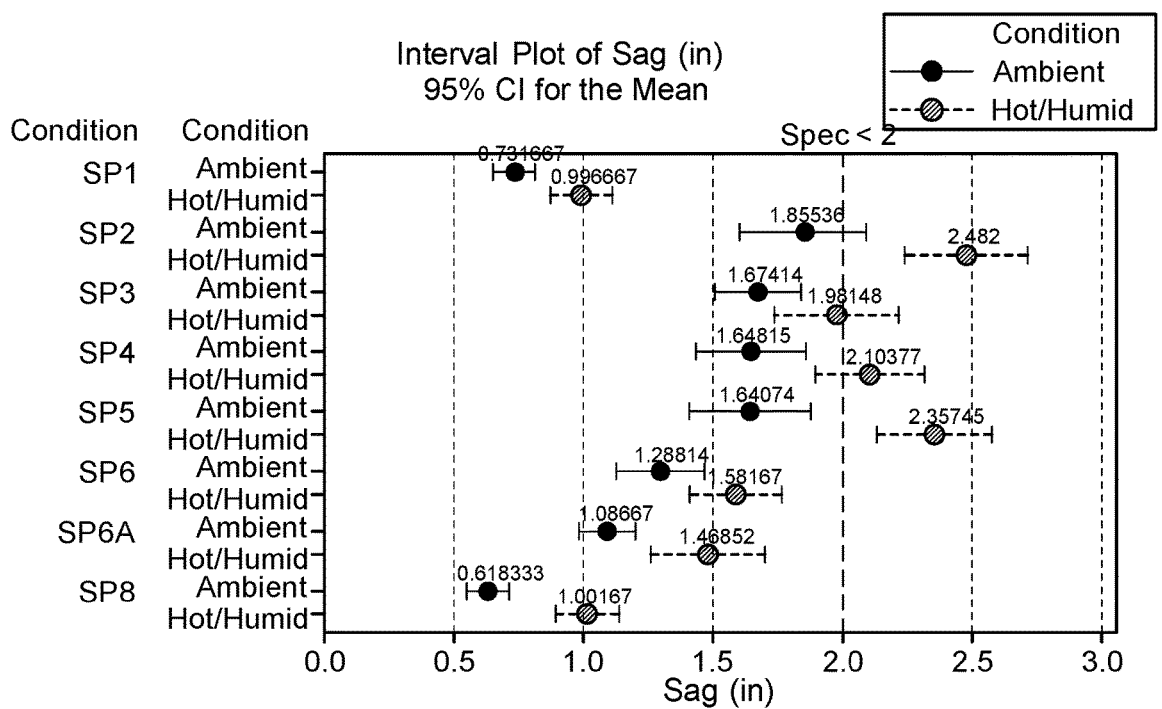
FIG. 27 is a graph showing the measured sag of mineral wool batts with a variety of binders applied thereto.

FIG. 27 is a graph showing the measured sag of the eight mineral wool batts described in Table 4. The dimensions of the batts are as follows: length=48", width=16", thickness=3". Sag is determined by supporting the batt one each end and measuring the deflection (inches) of the midpoint of the batt. Hot/Humid conditions are 3 days at 90° F. and 90% relative humidity.

Example 32

Figure 28:
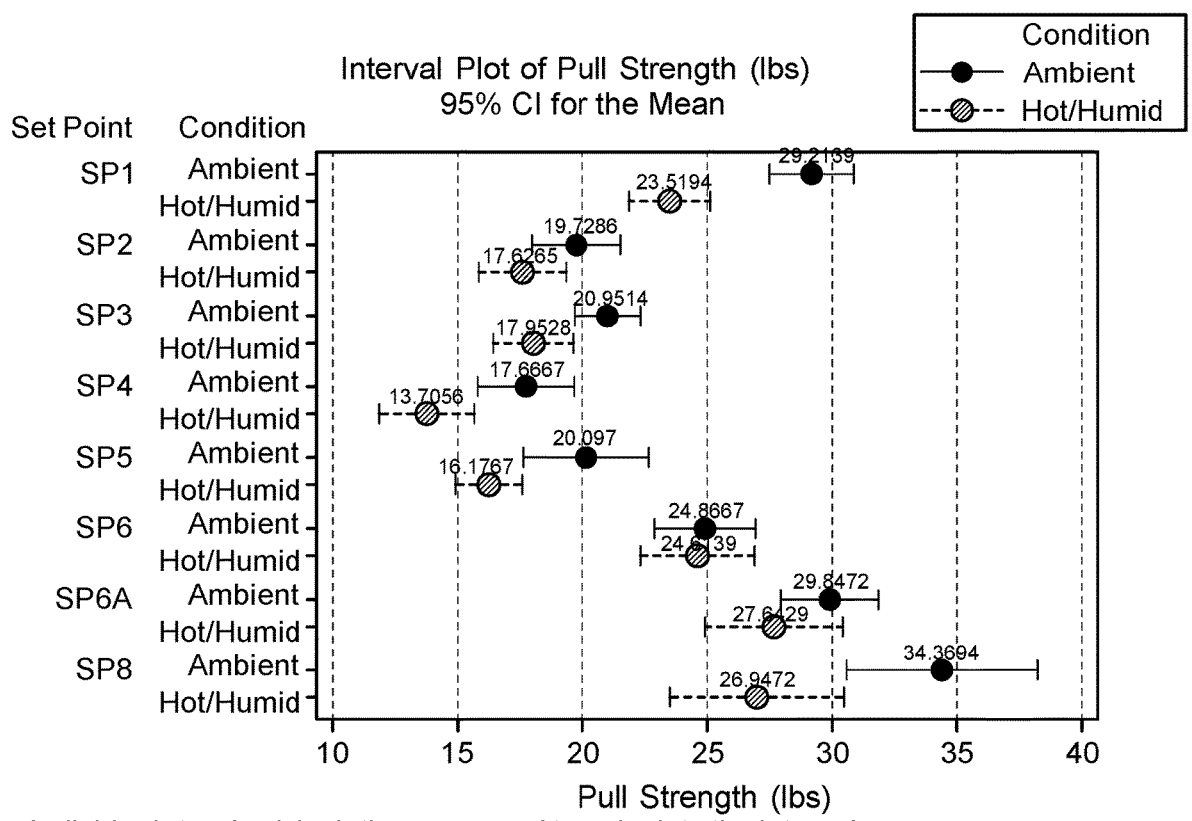
FIG. 28 is a graph showing the measured pull strength of mineral wool batts with a variety of binders applied thereto.

Pull strength is a measurement of the force required to pull a cured batt apart. FIG. 28 is a graph showing the measured pull strength of the eight mineral wool batts described in Table 4.

Example 33

Figure 29:
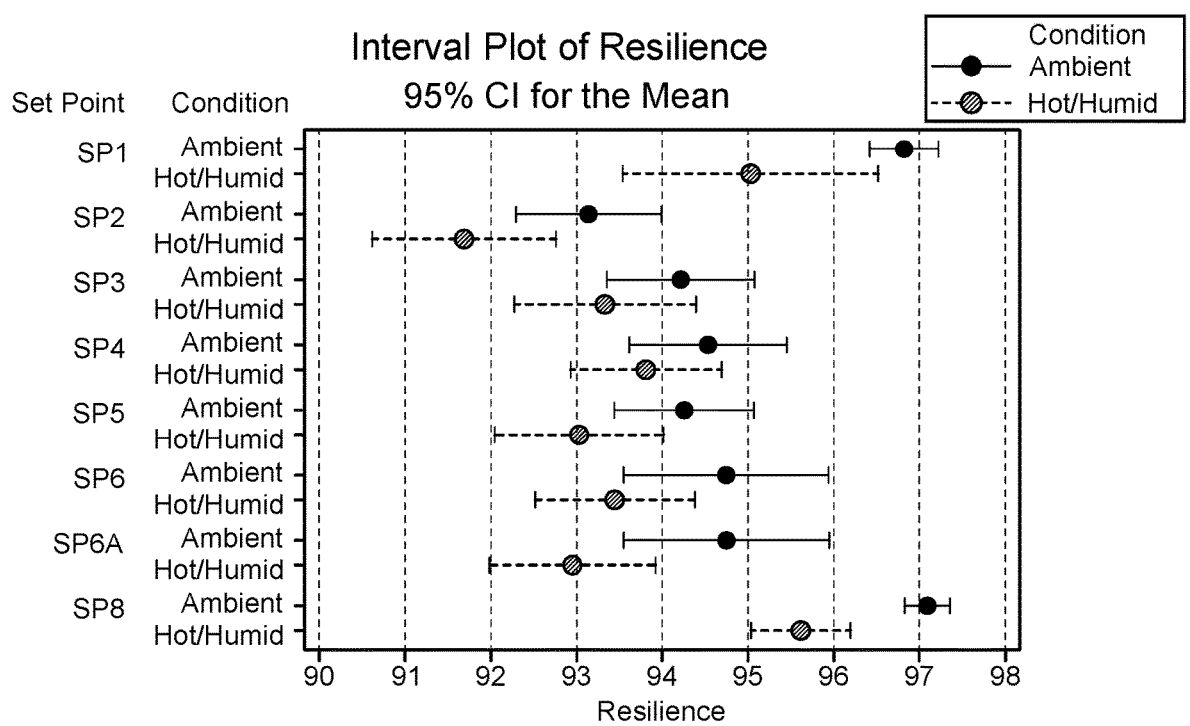
FIG. 29 is a graph showing the measured resilience of mineral wool batts with a variety of binders applied thereto.

Resilience is determined by measuring the thickness of the batt, compressing with a certain load for a given amount of time under either ambient or hot/humid conditions, the load is removed, and the thickness is re-measured. The thickness after compression is divided by the initial thickness and multiplied by 100 to give a % resilience. Resilience is similar to recovery but for light density batts. FIG. 29 is a graph showing the measured resilience of the eight mineral wool batts described in Table 4.

Example 34

Figure 30:
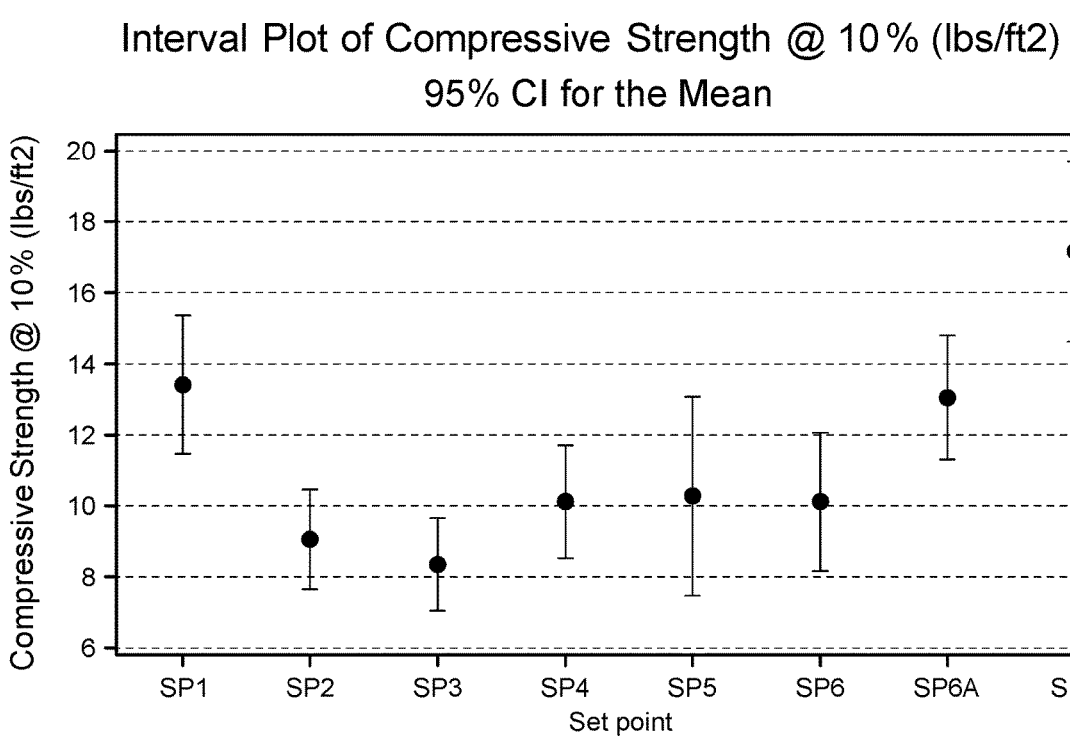
FIG. 30 is a graph showing the measured compressive strength of mineral wool batts with a variety of binders applied thereto.

Compressive strength is the amount of force required to compress a batt by 10% of its height (lbs/ft²). FIG. 30 is a graph showing the measured compressive strength of the eight mineral wool batts described in Table 4.

Example 35

Figure 31:
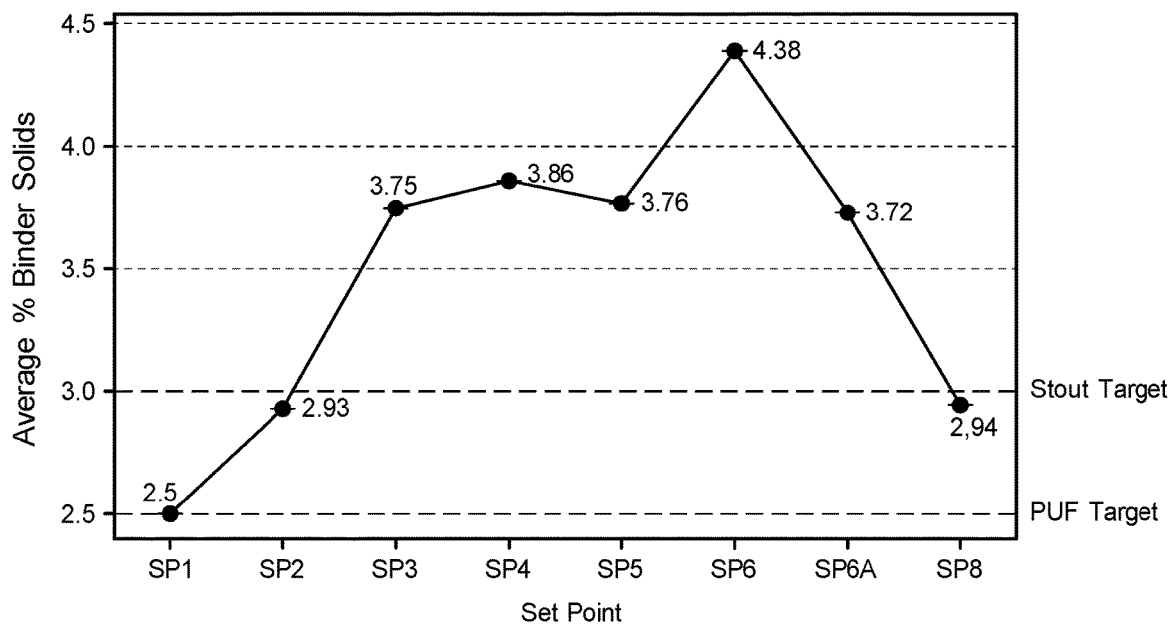
FIG. 31 is a graph showing amounts of binder solids for the binders.

FIG. 31 is a graph showing amounts of binder solids for the eight binders described in Table 4.

Example 36

Figure 32:
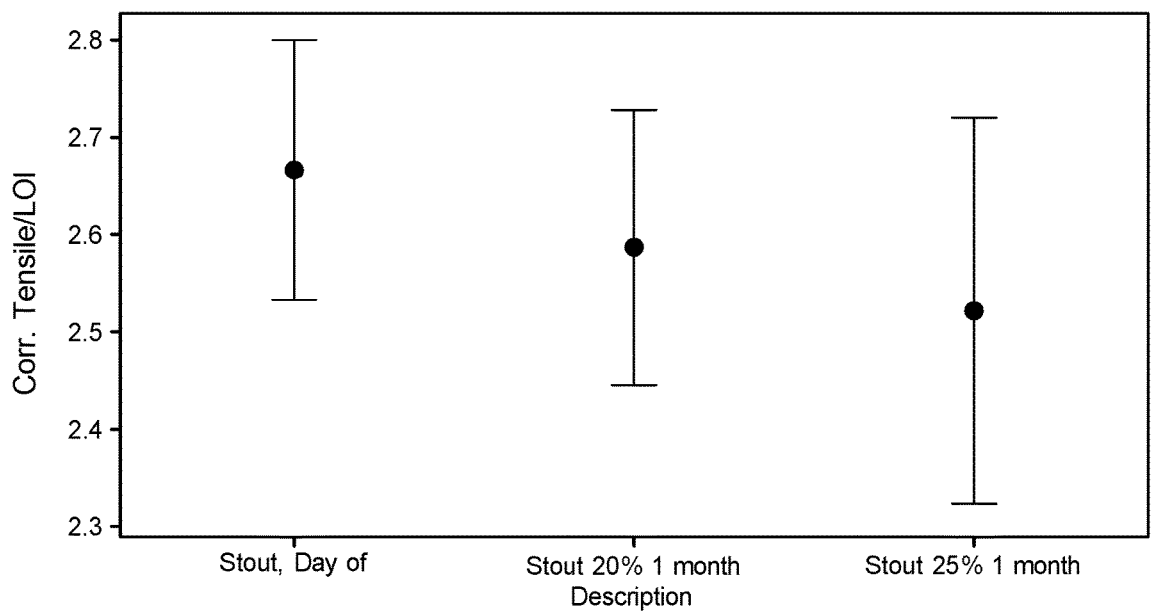
FIG. 32 is a graph showing the tensile strength for mineral wool handsheets prepared with $PV/Al(NO_3)_3$ binder system after storage.

Certain binder systems are known to perform differently upon storage. Often binder pre-mixes are known to have a relatively short shelf life. FIG. 32 is a graph showing the tensile strength for mineral wool handsheets prepared with 70:30 PV/Al(NO$_3$)$_3$ binder system applied at 20% and 25%, after storage. As can be seen from the graph, after two-months, the inventive binder system showed little or no reduction in performance.

Example 37

Figure 33:
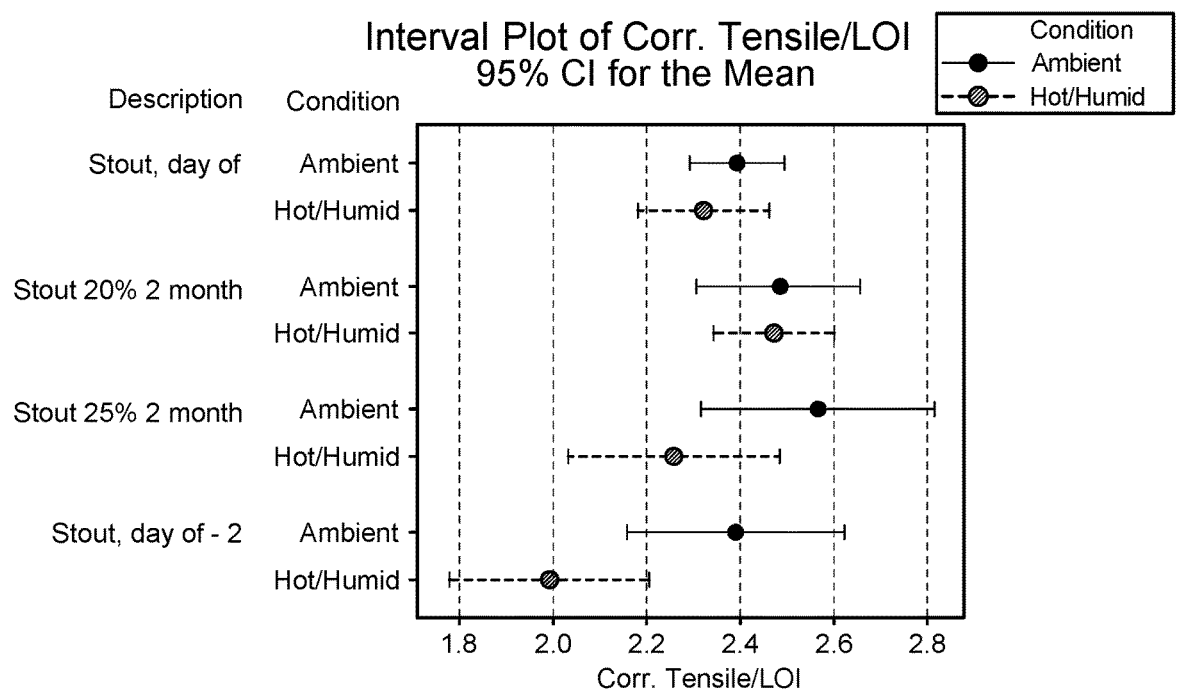
FIG. 33 is a graph showing the tensile strength for mineral wool handsheets prepared with $PV/Al(NO_3)_3$ binder system after storage.

FIG. 33 is a graph showing the tensile strength for mineral wool handsheets prepared with PV/Al(NO$_3$)$_3$ binder system, after storage. The tensile strength is corrected for the amount of binder (measured by loss on ignition).

Example 38

Figure 34:
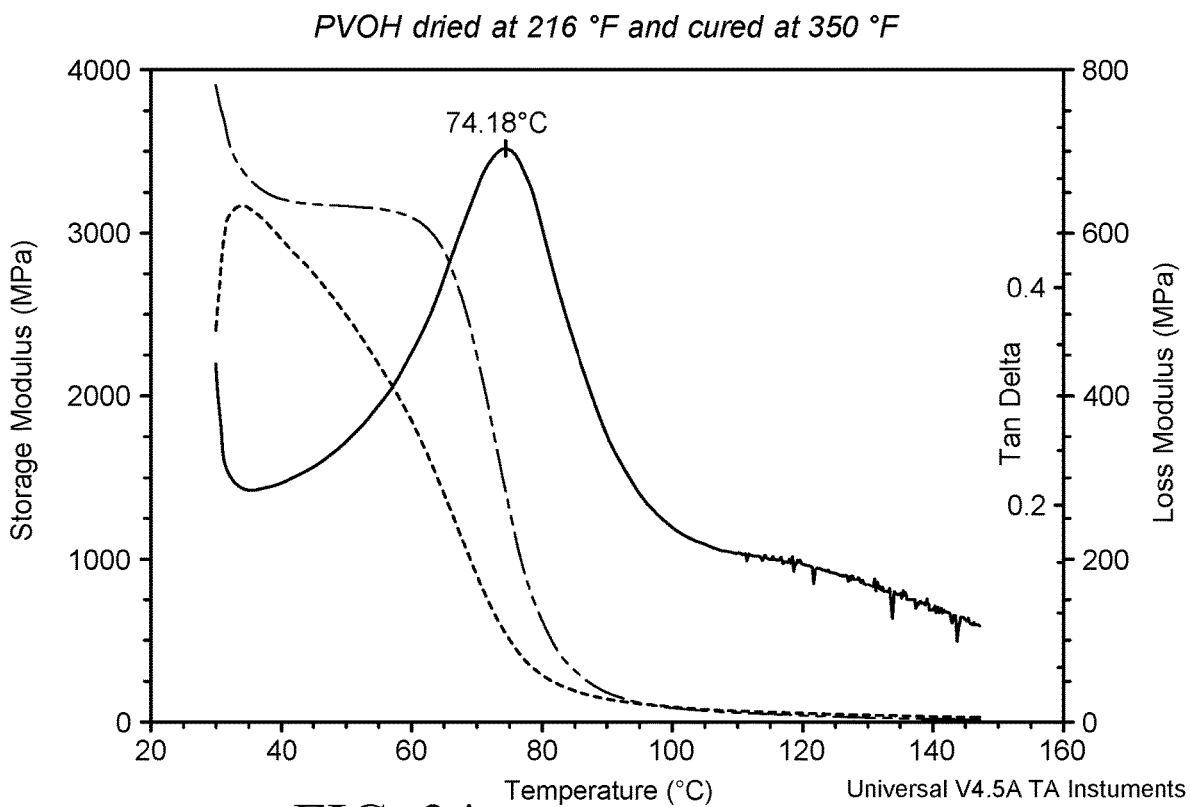
FIG. 34 is a plot of the dynamic mechanical analysis of a PV film.
Figure 35:
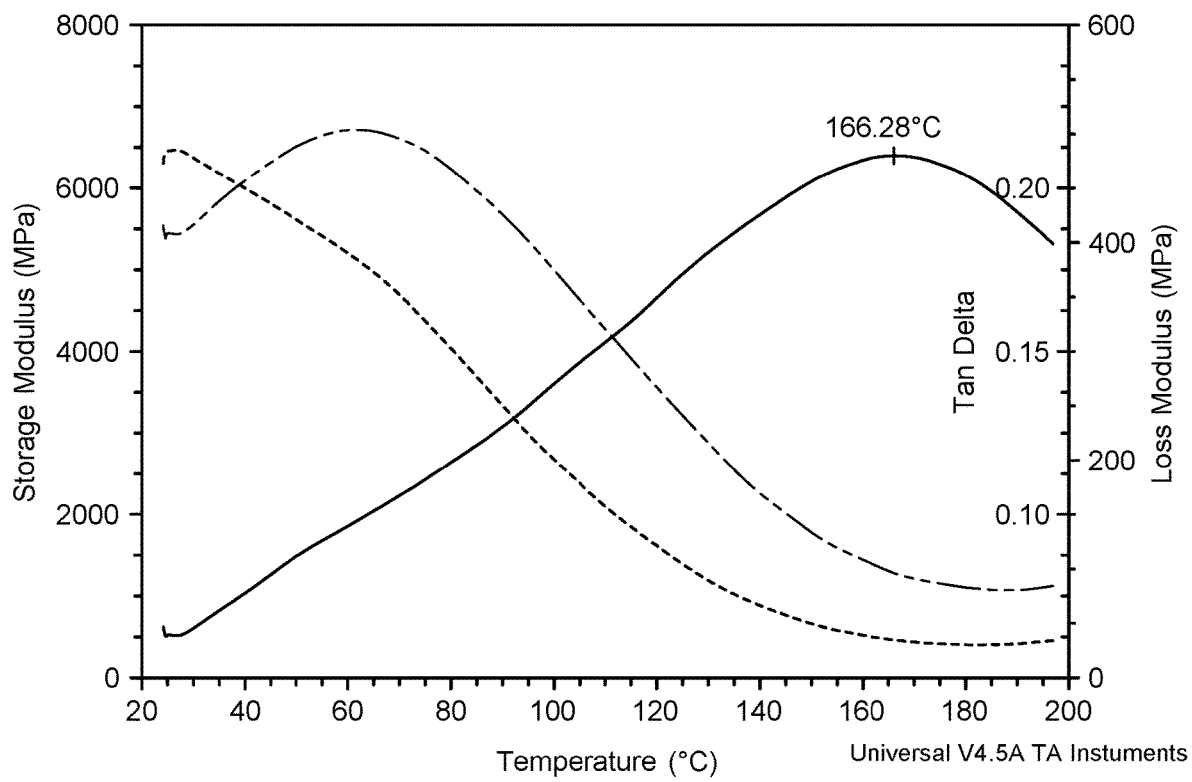
FIG. 35 is a plot of the dynamic mechanical analysis of a $PV/Al(NO_3)_3$ binder.
Figure 36:
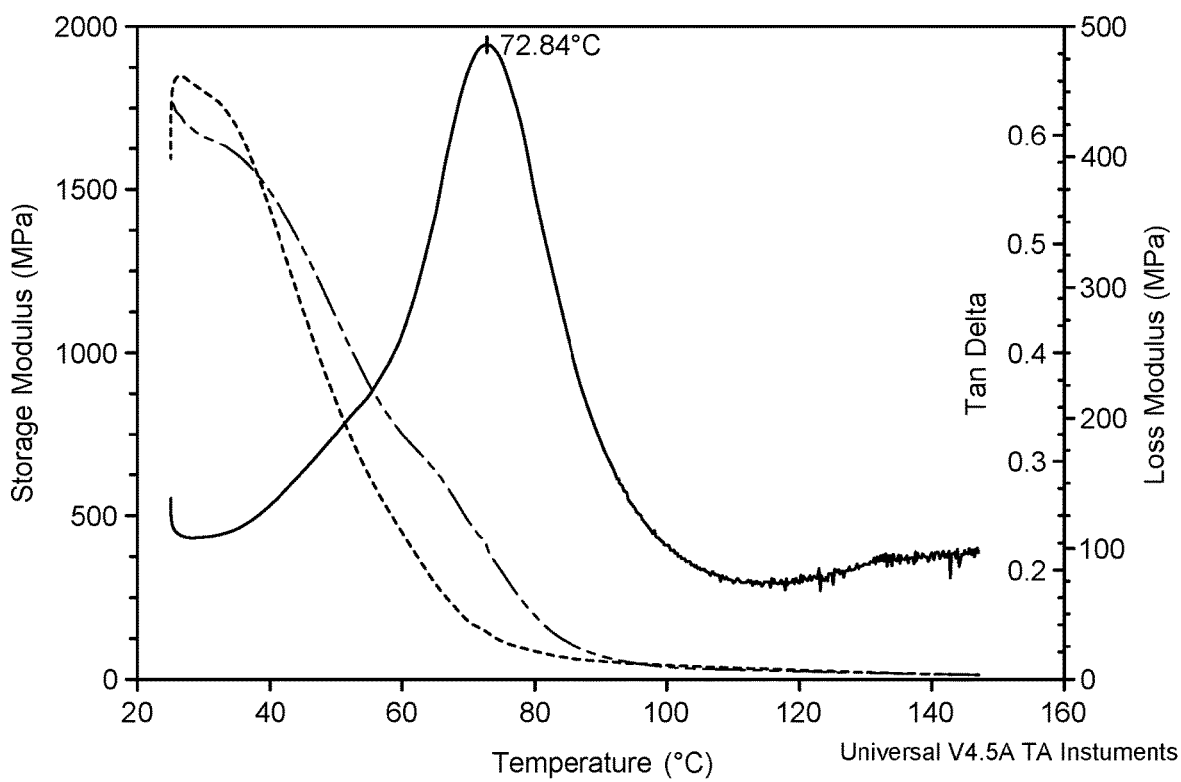
FIG. 36 is a plot of the dynamic mechanical analysis of a $PV/KNO_3$ binder for comparison.

Dynamic Mechanical Analysis (DMA) of a film formed from a binder formulation is a helpful toll to estimate the glass transition temperature (Tg) of a film. A shift in Tg to a higher temperature is indicative of crosslinking. FIG. 34 is a plot of the DMA of a film formed from PVOH alone. FIG. 35 is a plot of the DMA of a PV/Al(NO$_3$)$_3$ binder. Addition of the Al(NO$_3$)$_3$ shifts the Tg of the film to a higher temperature. FIG. 36 is a plot of the DMA of a PV/KNO$_3$. Substitution of potassium for the aluminum results in a Tg closer to the PVOH film. A similar measurement was performed by adding phosphoric acid to mimic acidic conditions. This also did not perform as well as the PV/Al(NO$_3$)$_3$ binder system. Both of these results indicate a necessary role for aluminum in the overall performance of the binder system.

As can be seen from the Examples, the inventive binder compositions are able to produce insulative products with performance that, in certain instances, meets or exceeds that of a conventional binder system. In certain instances, decreasing the curing temperature provided product with qualitative improvements, but did not demonstrate statistically significant performance changes. Addition of processing aids such as polyethylene glycol and glycerol improved product performance in certain tests. Generally, the inventive binder system did not sacrifice performance when tested under hot/humid conditions.

The general inventive concepts have been described above both generically and with regard to specific embodiments. Although the invention has been set forth in what is believed to be some preferred embodiments, a wide variety of alternatives known to those of skill in the art can be selected within the broader disclosure. The invention is not otherwise limited, except for the recitation of the claims set forth below.

What is claimed is:

1. A fibrous insulation product comprising:
a plurality of fibers; and
a binder composition applied to at least a portion of the fibers, the binder composition comprising:
water;
a metal salt;
and a polyol;
wherein a weight ratio of the metal salt to the polyol is in the range of 1:19 to 1:1; and
wherein the polyol is polyvinyl alcohol which is at least 50% hydrolyzed; and
wherein the binder composition is present in the fibrous insulation product in an amount of 1% to 25% loss on ignition;
wherein the binder composition cures to form a network comprising the metal salt.

2. The fibrous insulation product of claim 1, wherein the metal salt comprises a metal selected from the group consisting of boron, aluminum, gallium, indium, tin, iron, zinc, titanium, bismuth, zirconium, and combinations thereof.

3. The fibrous insulation product of claim 2, wherein the metal salt is a salt of aluminum.

4. The fibrous insulation product of claim 3, wherein the metal salt is selected from the group consisting of aluminum chloride, aluminum nitrate, aluminum sulfate aluminum phosphate monobasic, sodium aluminate, and combinations thereof.

5. The fibrous insulation product of claim 1, wherein the polyvinyl alcohol has a viscosity of 3-5 centipoise.

6. The fibrous insulation product of claim 1, wherein the insulation product is free of added formaldehyde.

7. The fibrous insulation product of claim 1, wherein the fibers are glass fibers.

8. A non-woven mat comprising:
a plurality of fibers in the form of a mat having a first major surface and a second major surface; and
a binder composition at least partially coating said first major surface of said mat, said binder composition comprising:
water;
a metal salt;
and a polyol;
wherein a weight ratio of the metal salt to the polyol is in the range of 1:19 to 1:1; and wherein the polyol is polyvinyl alcohol which is at least 50% hydrolyzed; and
wherein the binder composition is present in the non-woven mat in an amount of 1% to 25% loss on ignition
wherein the binder composition cures to form a network comprising the metal salt.

9. The non-woven mat of claim 8, wherein the fibers are glass fibers wherein the fibers have an average diameter within the range of 6.5 microns to 24 microns.

10. A method of making a fibrous insulation product comprising:
forming a fibrous blanket including a plurality of fibers;
applying a binder composition to at least a portion of said fibers, said binder composition comprising:
water;
a metal salt;
and a polyol;
wherein a weight ratio of the metal salt to the polyol is within the range of 1:19 to 1:1, and wherein the polyol is polyvinyl alcohol which is at least 50% hydrolyzed;
passing the fibrous blanket through an oven to at least partially cure the binder to form a network comprising the metal salt on the fibrous blanket and form an insulation product,
wherein the binder composition is present in the fibrous insulation product in an amount of 1% to 25% loss on ignition.

11. The method of claim 10, wherein the fibers are glass fibers.

* * * * *